United States Patent
Suzuki

[11] Patent Number: 5,831,670
[45] Date of Patent: Nov. 3, 1998

[54] CAMERA CAPABLE OF ISSUING COMPOSITION INFORMATION

[75] Inventor: Hirobumi Suzuki, Saitama, Japan

[73] Assignee: Nikon Corporation, Tokyo, Japan

[21] Appl. No.: 668,372

[22] Filed: Jun. 18, 1996

Related U.S. Application Data

[63] Continuation of Ser. No. 219,460, Mar. 29, 1994, abandoned.

[30] Foreign Application Priority Data

Mar. 31, 1993 [JP] Japan .................................. 5-073774
Mar. 23, 1994 [JP] Japan .................................. 6-051814

[51] Int. Cl.⁶ ........................................... H04N 5/225
[52] U.S. Cl. ..................... 348/207; 348/208; 348/358
[58] Field of Search .................................. 348/207, 208, 348/240, 358, 239; 358/906; 396/147, 287; H04N 5/225

[56] References Cited

U.S. PATENT DOCUMENTS 5,019,854  5/1991  Mukai et al. ............................ 396/147
5,182,443  1/1993  Suda et al. ............................. 250/201.2
5,266,985  11/1993 Takagi .................................... 396/147
5,296,888  3/1994  Yamda .................................... 396/147
5,335,035  8/1994  Maeda .................................... 351/210

FOREIGN PATENT DOCUMENTS 4-67133  3/1992  Japan .............................. G03B 17/18
4-73731  3/1992  Japan .............................. G03B 17/18

*Primary Examiner*—Wendy Garber
*Assistant Examiner*—Tuan V. Ho
*Attorney, Agent, or Firm*—Oliff & Berridge, PLC

[57] ABSTRACT

A camera according to the present invention is provided with a view point information detection circuit that detects information related to the distribution of the view points of a photographer within the photographic field and issues signals related to the result of that detection, a composition quality estimation circuit that estimates whether or not a given composition is good based upon the signal issued from the view point information detection circuit and then issues signals related to the result of that estimation, and a warning device that issues a warning when the signal indicating poor composition has been issued from the composition quality estimation circuit.

21 Claims, 40 Drawing Sheets

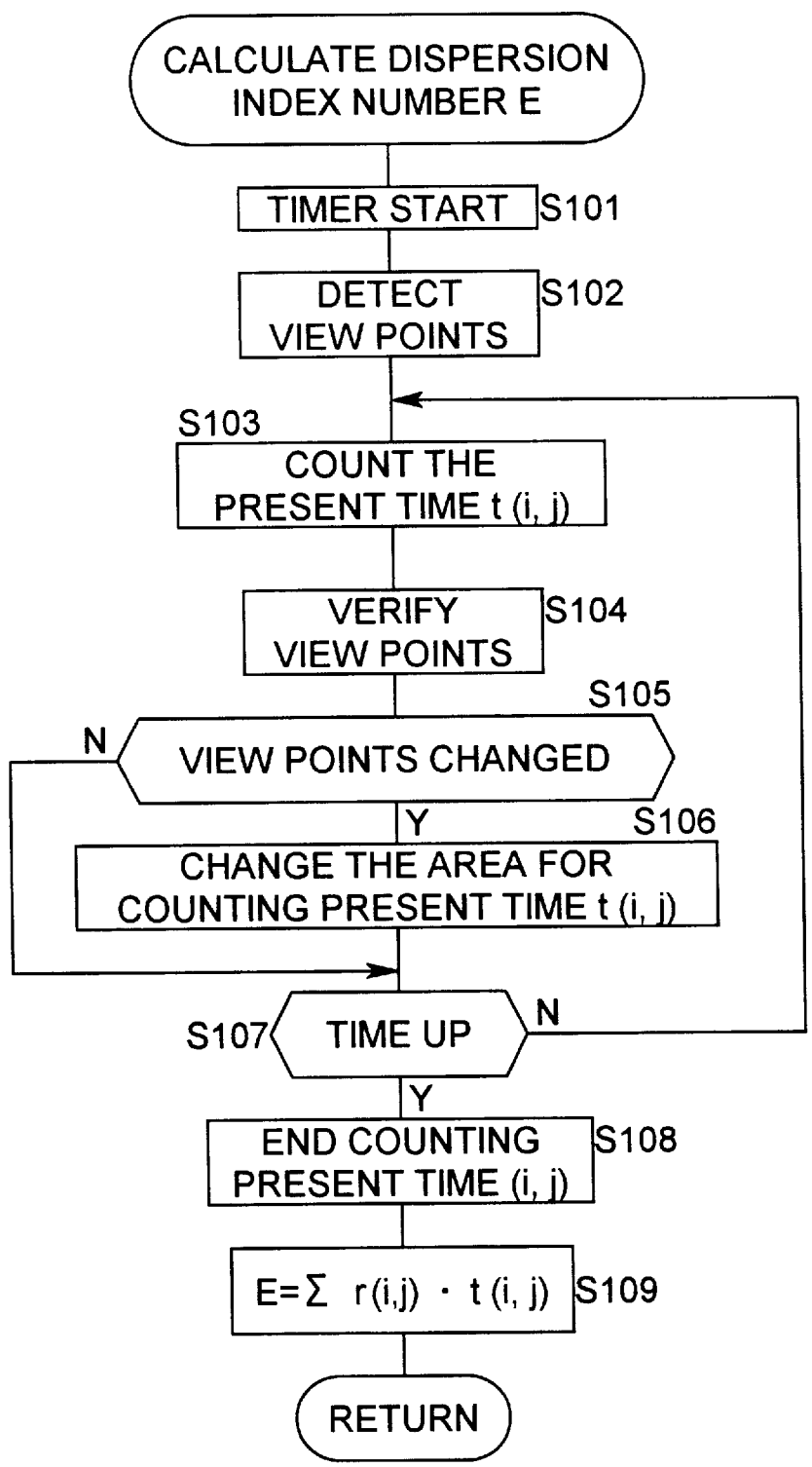

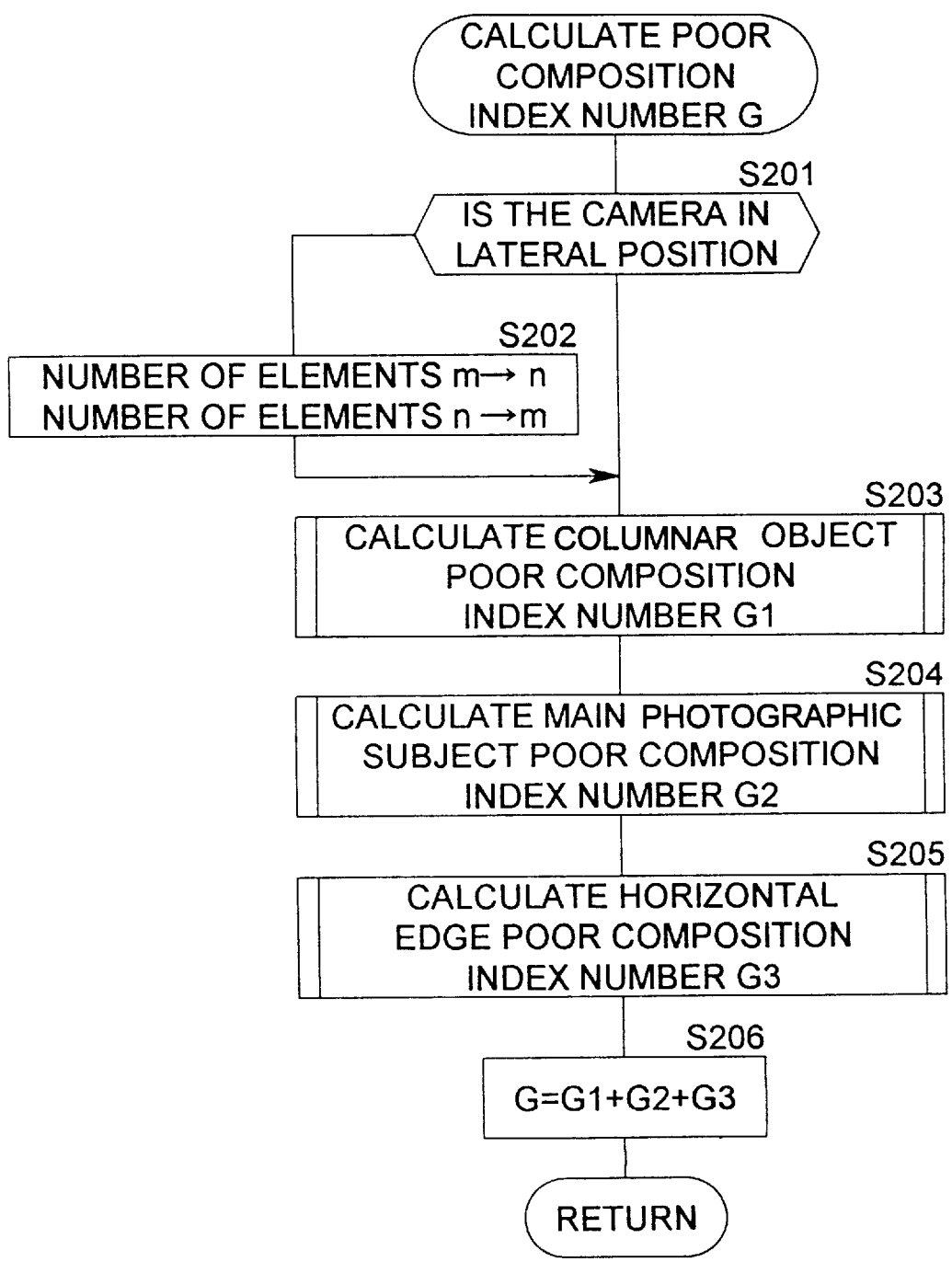

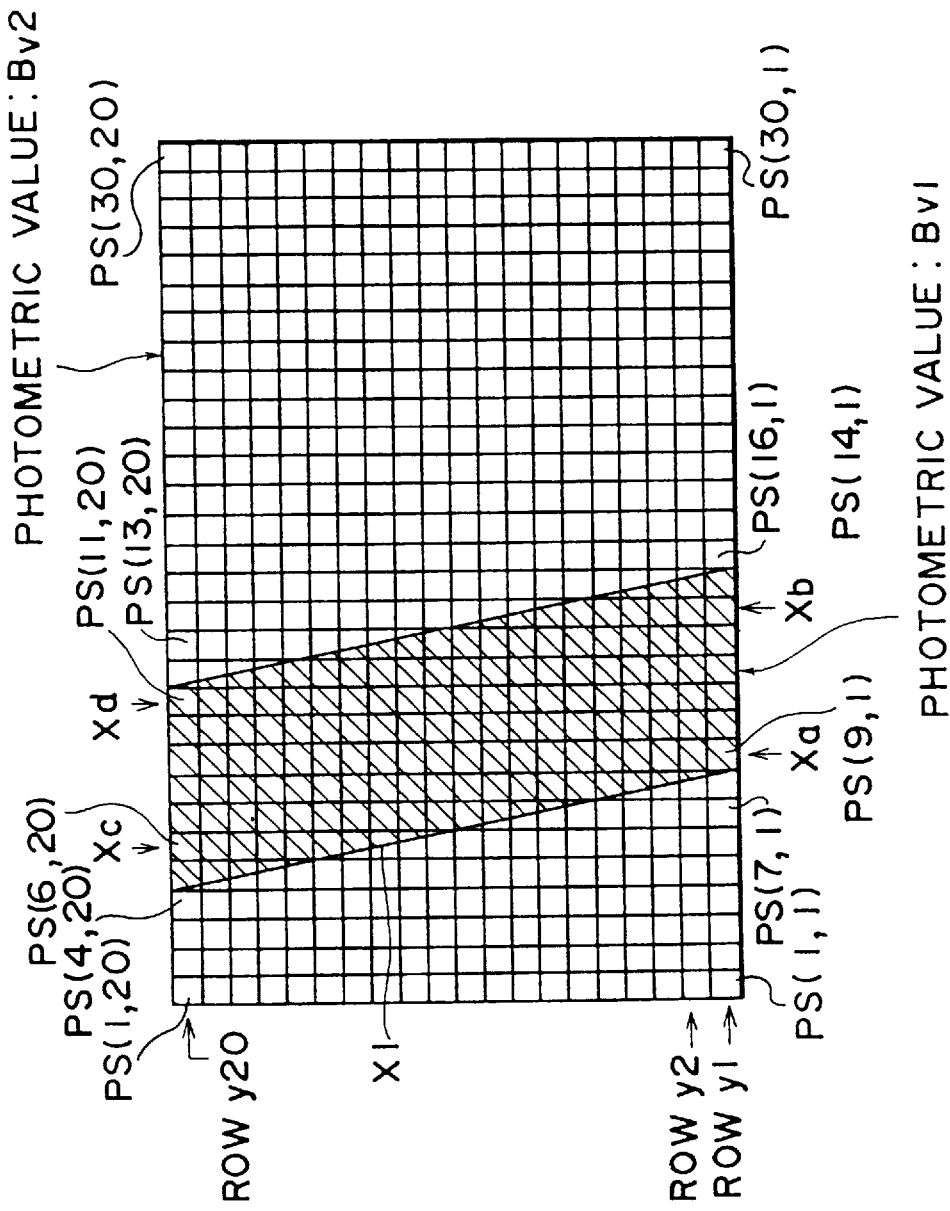

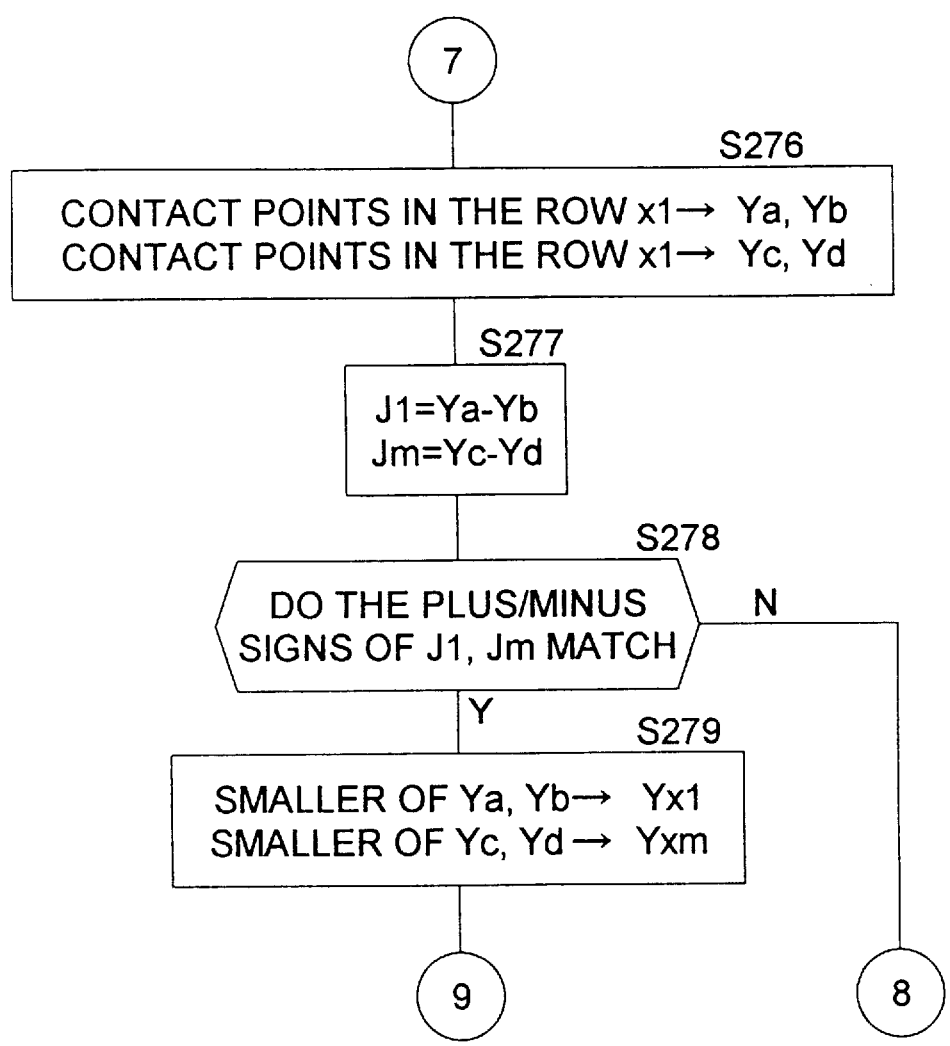

CAMERA CAPABLE OF ISSUING COMPOSITION INFORMATION

This is a Continuation of application Ser. No. 08/219,460 filed Mar. 29, 1994, now abandoned.

BACKGROUND OF THE INVENTION

1. Field of the Invention

The present invention relates to a camera capable of issuing information related to a composition.

2. Description of the Related Art

A number of common examples of poor composition that give an unpleasant feeling to the viewer of a photograph are known conventionally through experience, and cameras that prevent the taking of pictures with poor composition by determining whether or not a particular composition falls into one of these typical examples have been suggested. For example, in the Japanese Patent Unexamined Publication 4-67133, a camera is disclosed that measures the distribution of brightness within a specific range in the vertical direction and the horizontal direction from the center of the photographic field and which issues a poor composition warning to the photographer when the contrast within this range is higher than a specific value. The typical examples of poor composition described above include a composition in which an edge that divides the photographic field into two parts, such as the horizon, crosses the neck of a person, and one in which a structure such as a telephone pole or a tree extends upward from the head of a person. In the camera disclosed in the publication mentioned above, these typical examples can be accurately identified as long as the face of the person is captured at the center of the photographic field.

However, typical examples of poor composition are not limited to the two examples described above. For example, a composition in which an inclined edge divides the photographic field into two parts is considered to be a poor composition, since it gives the viewer a sense of instability. This sort of inclination cannot be detected by the camera disclosed in the publication mentioned above. Also, when photographing a person who is off center in the photographic field, the camera disclosed in the publication mentioned above cannot detect poor composition, even if the horizon, a telephone pole or the like overlaps the head of the person. Furthermore, when the brightness is low, accurate judgment cannot be made as the contrast within the photographic field is low.

SUMMARY OF THE INVENTION

The camera capable of issuing composition information according to the present invention comprises a view point information detection means for detecting information related to the distribution of the view points of the photographer within the photographic field, a composition quality estimation means for estimating whether or not the composition is good based upon the detected information related to the distribution of the view points, and a warning means for issuing a warning when the composition has been estimated to be poor.

BRIEF DESCRIPTION OF THE DRAWINGS

FIG. 5 is a flow chart showing the details of the calculation procedure for the dispersion index number E shown in FIG. 4B;

FIG. 10 is a flow chart showing the details of the calculation procedure for the poor composition index number G shown in FIG. 9;

FIG. 14 shows the correspondence between the composition in FIG. 12B and the arrangement of the elements shown in FIG. 13;

FIGS. 17A through 17C are flow charts showing the details of the calculation procedure for the horizontal edge poor composition index number G3 in FIG. 10;

FIGS. 32A through 32D show examples of variations of the warnings for composition correction and the like;

FIGS. 33A through 33D show examples of variations of the warnings for composition correction and the like;

DESCRIPTION OF THE PREFERRED EMBODIMENT

First Embodiment

The first embodiment according to the present invention is explained in reference to FIGS. 1 through 5.

Figure 1:
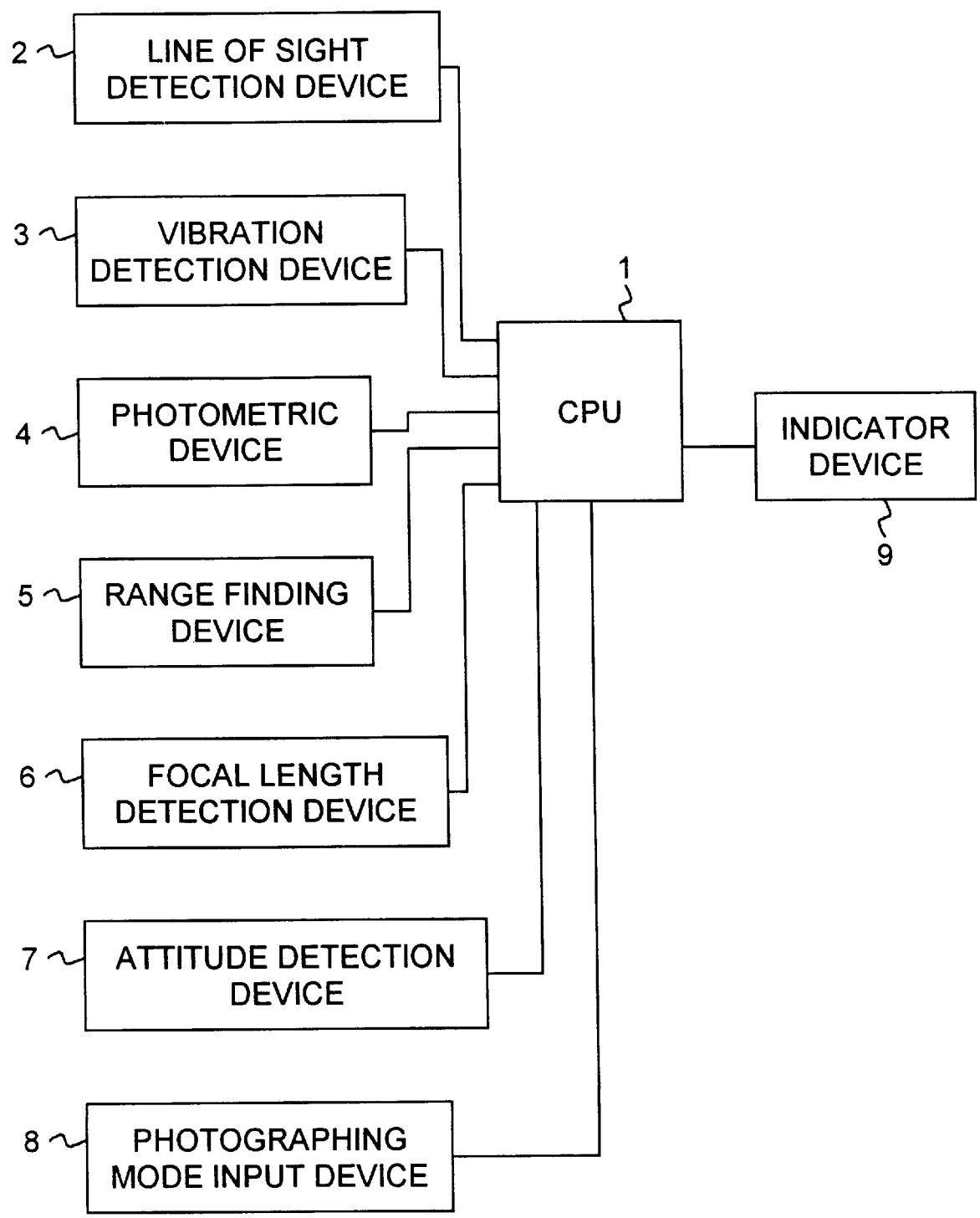
FIG. 1 is a block diagram of the control system in the first embodiment according to the present invention.

FIG. 1 is a block diagram of the control system of the camera according to the first embodiment. Number 1 in the figure indicates the CPU which is provided with a microcomputer and peripheral devices and which controls the operation of the camera. The line of sight detection device 2, the vibration detection device 3, the photometric device 4, the range finding device 5, the focal length detection device 6, the attitude detection device 7, the photographing mode input device 8 and the indicator device 9 are connected to the CPU 1.

Figure 2:
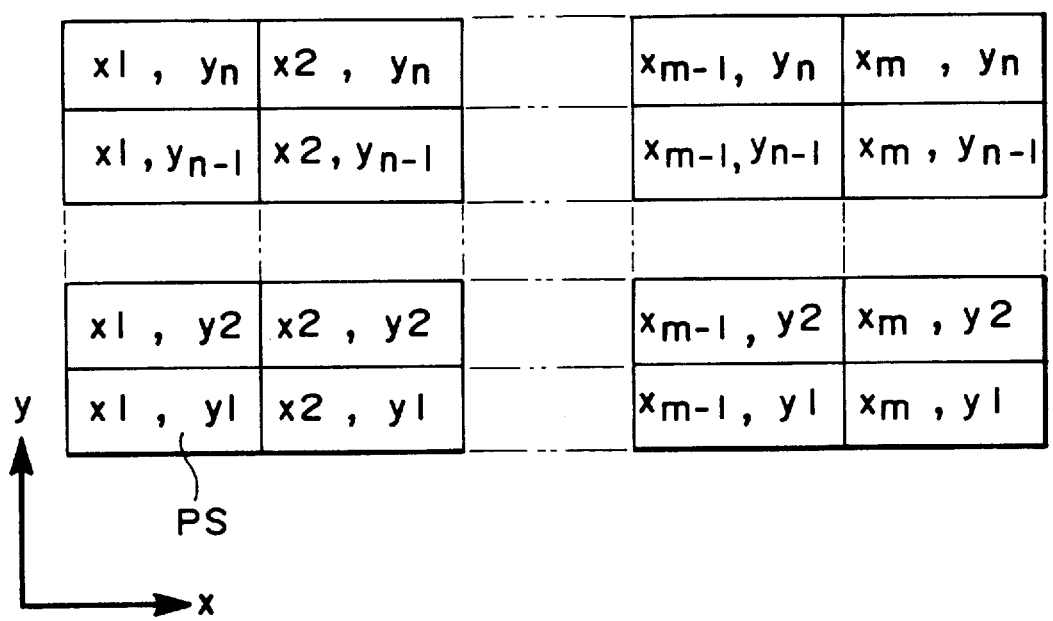
FIG. 2 shows the arrangement of the photometric device 4 in FIG. 1.

The line of sight detection device 2 radiates an infrared light toward the pupil of the photographer who is looking in the view finder (not shown in the figure) of the camera, and determines the aspect of the eyeball based upon the reflected light from the cornea and the eyeball image to specify the view point of the photographer within the photographic field. The details of such a line of sight detection device are given in, for example, U.S. Pat. No. 5,182,443 and so its explanation is omitted here. The information related to the view points detected by the line of sight detection device 2 is sent to the CPU 1. The vibration detection device 3 detects the magnitude of hand-motion vibration based upon, for example, the acceleration or angular velocity of the camera body and outputs a signal to the CPU 1 that corresponds to the detected magnitude of vibration. The photometric device 4 is a two dimensional charge storage type image sensor that performs photometry by partitioning the photographic image plane with the light reading elements PS, which are arranged in the form of a matrix of n rows×m columns, as shown in FIG. 2. The positions of the elements PS of the photometric device 4 are indicated with coordinate values in a two dimensional rectangular coordinate system, which takes the horizontal direction of the photographic field as the x axis and the vertical direction as the y axis, as shown in FIG. 2. Note that FIG. 2 shows the state of the lateral position of the camera in which the photographic field turns laterally. In the longitudinal position of the camera in which the photographic field turns longitudinally, the direction of the short sides of the photographic field is the direction of the x axis and the direction of the long side is the direction of the y axis.

The range finding device 5 detects the photographing distance (the distance between the film surface in the camera and the main photographic subject) and outputs a signal that corresponds to the result of the detection to the CPU 1. The detection of the photographing distance is calculated, for example, based upon the rotational position of the focusing ring of the photo-taking lens, or it is detected by radiating an infrared light on the photographic subject. The focal length detection device 6 reads out the information related to the focal length of the photo-taking lens from the internal ROM of the photo-taking lens and outputs the information to the CPU 1. In a camera in which the photo-taking lens cannot be replaced, this focal length detection device 6 may be omitted and the focal length information may be supplied to the CPU 1 in advance.

The attitude detection device 7, detects whether or not the camera is in a lateral or longitudinal position and outputs the result to the CPU 1. As has already been described, the lateral position refers to the position in which the direction of the long sides of the photographic field and the direction of the horizon are the same and the longitudinal direction refers to the position in which the direction of the short sides of the photographic field and that of the horizon are the same. The photographing mode input device 8 is for the photographer to set the photographing mode that corresponds to the purpose of the photographing, such as the portrait mode for photographing a person and the landscape mode for photographing landscapes. The indicator device 9 is equipped with a function for displaying photographing information such as the exposure value on the upper surface of the camera body and in the view finder and is also equipped with a warning function such as a buzzer, a synthesized sound, a vibration or the like.

The CPU 1 reads signals from the various devices 2~8 as necessary, controls the shutter and the aperture (not shown) and drives the photo-taking lens to the in focus position. Also, the CPU 1 performs the composition estimation processing by following the procedure shown in FIGS. 4A and 4B prior to a photographing operation. The following is an explanation of the composition estimation processing. The composition estimation processing is executed, for example, in response to pressing the release button half way down.

Figure 3A:
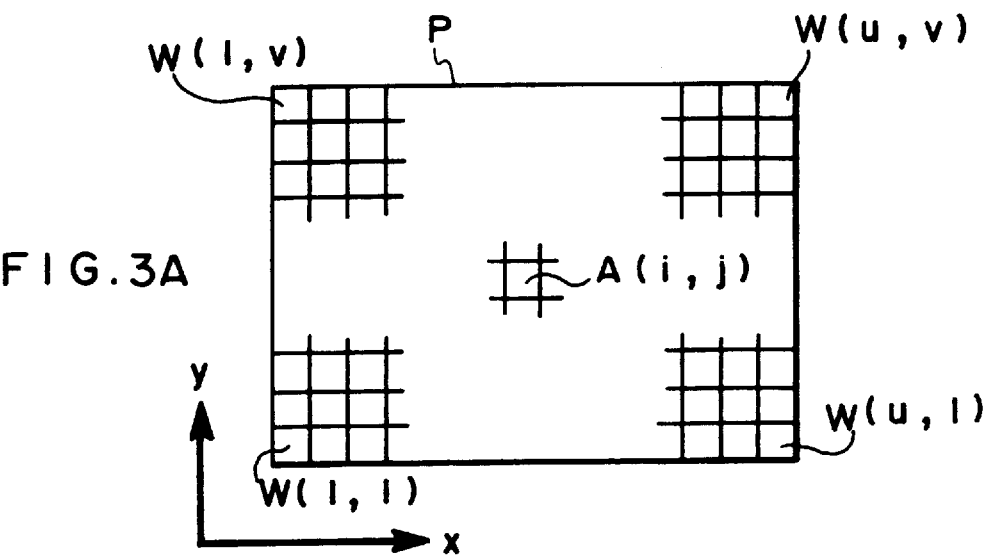
FIGS. 3A through 3C are drawings for explaining the calculation processing of the dispersion index number E performed by the CPU 1 in FIG. 1.
Figure 4A:
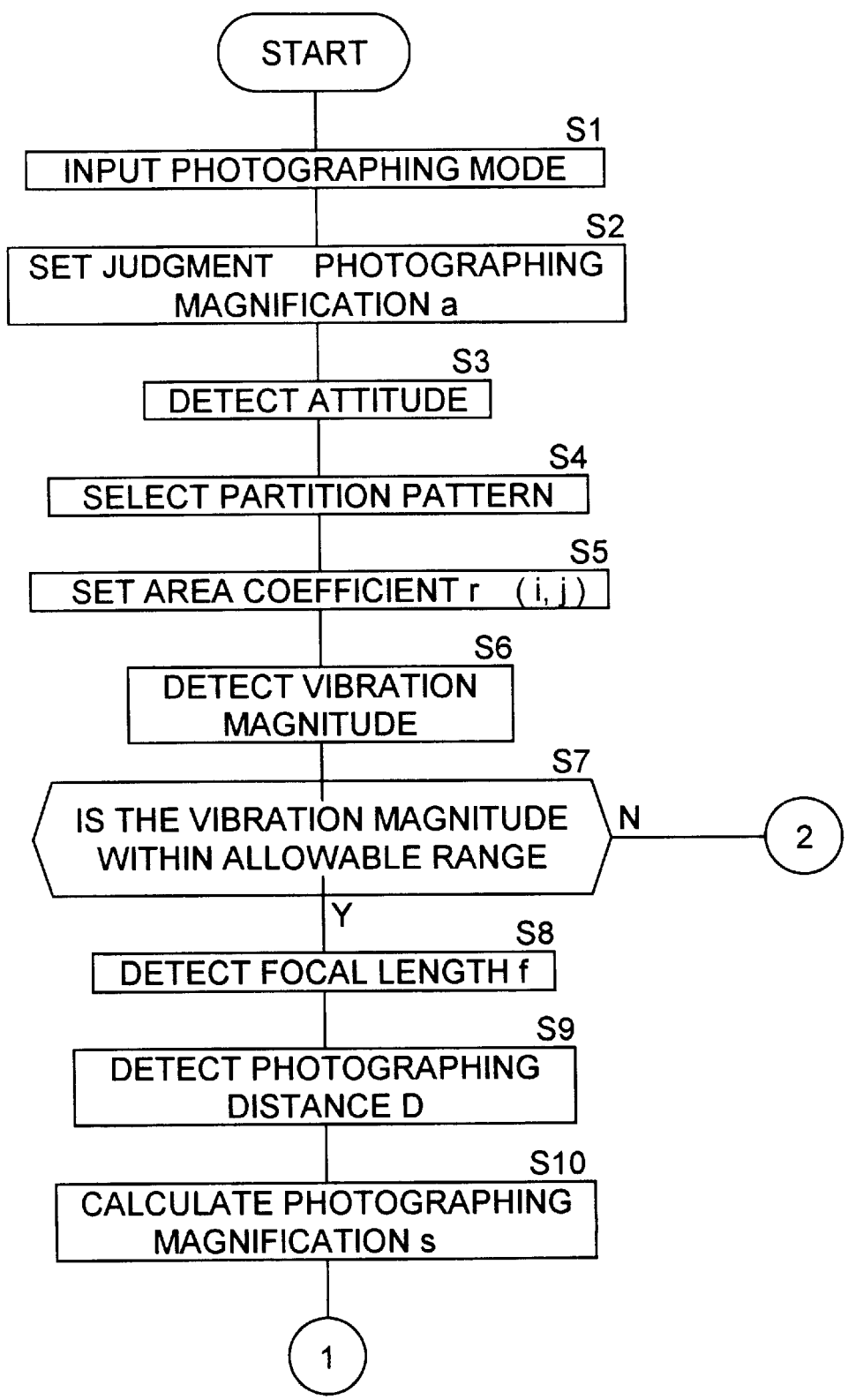
FIGS. 4A and 4B are flow charts showing the composition estimation procedure in the CPU 1 in FIG. 1.
Figure 4B:
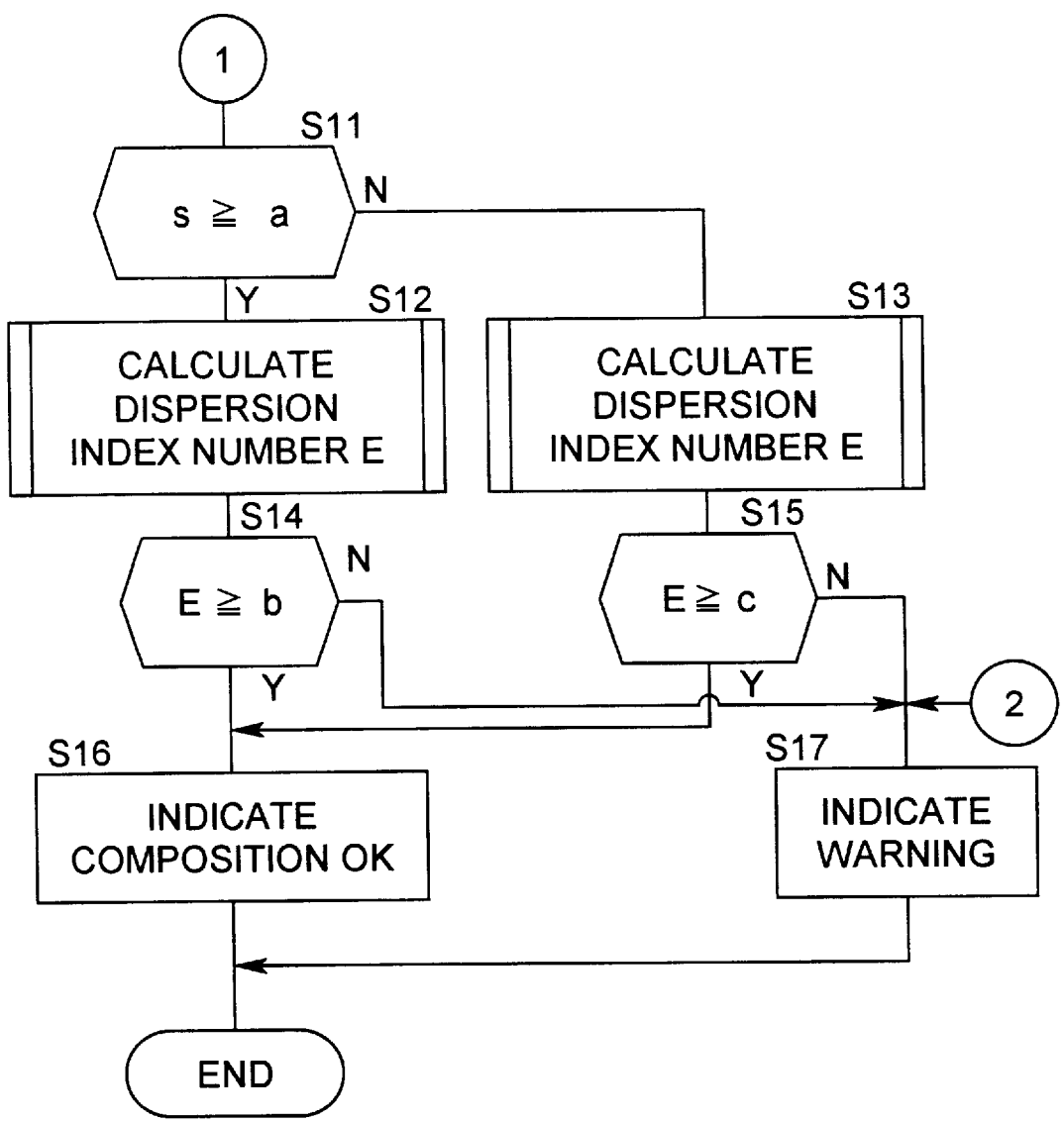

As shown in FIGS. 4A and 4B, in the composition estimation processing, the photographing mode, which is input from the photographing mode input device 8, is read in step S1. In step S2 that follows, the judgement photographing magnification a that corresponds to the photographing mode is set. The judgement photographing magnification a is explained later. In step S3, the attitude of the camera is detected from the output of the attitude detection device 7 and in step S4 that follows, the partition pattern of the photographic field that is required for the processing of the signal from the line of sight detection device 2 is selected according to the attitude of the camera. For example, when the camera is in the lateral position, the pattern in which the photographic field P is partitioned into a matrix-like area W of v rows by u columns, as shown in FIG. 3A, is selected. The number of partitions of this partition pattern (values of u, v) may be the same as, or different from the number of partitions of the photometric device 4 (values of m, n) described above. Hereafter, we assume that the position of the area W is the same as the area partitioned by the photometric device 4, that the position of the area W is expressed as coordinate values of the 2-dimensional rectangular coordinate system wherein the horizontal direction in the photographic field is the x axis and the vertical direction is the y axis and that the area of a given position W is expressed as W(i, j). An illustration of the partition pattern when the camera body is held in the longitudinal position is omitted.

After the partition pattern is selected in step S4, the area coefficient α is set in correspondence to the partition pattern in step S5. For example, when the partition pattern shown in FIG. 3A is selected, the area coefficients α (1, 1)~α (i, j)~α (u, v) are assigned to area W (1, 1)~W(i, j)~W(u, v) respectively. The area coefficient α (i, j) is set larger as it moves further away from the center of the photographic field. The area coefficient α (i, j) is increased in proportion with the distance from the center of the photographic field or it may be changed so that it will be an increasing function (quadratic or more) of the distance.

After setting the area coefficient α, the signal from the vibration detection device 3 is read in step S6, and in step S7 that follows, a decision is made as to whether or not the detected magnitude of vibration is within the allowable range. If the magnitude of vibration is within the allowable range, the operation proceeds to step S8 and if it exceeds the allowable range, the operation proceeds to step S17. The reason why the magnitude of vibration is judged is that when the camera vibration increased, the composition cannot be fixed and the photographic field goes unstable, then the detection accuracy of view points goes deteriorate.

In step S8, the focal length f of the photo-taking lens is detected according to the signal from the focal length detection device 6 and in step S9 that follows, the photographing distance D is determined from the signal sent from the range finding device 5. In step S10, the photographing magnification β is determined using the formula β=f/(D−f). For simplification, the formula may be β=f/D.

In step S11 that follows (FIG. 4B), a decision is made as to whether or not the calculated photographing magnification β is equal to or greater than the judgement photographing magnification a which has been set in step S2. If it is equal to or greater than the judgement photographing magnification a, the operation proceeds to step S12 and if it is less than the judgement photographing magnification a, then the operation proceeds to step S13. In step S12 or step S13, the index number (hereafter referred to as the dispersion index number) E that indicates the degree of dispersion of the view points of the photographer within a specific period of time, is calculated based upon the view points detected by the line of sight detection device 2, the partition pattern that was set in step S4 and the area coefficient that was set in step S5. The following is an explanation of the calculation procedure for this dispersion index number E in reference to FIG. 5.

In the processing shown in FIG. 5, first, the timer that sets the calculation frequency for the dispersion index number E is activated in step S101. Then, in step S102 that follows, the position of the visual focal point detected by the line of sight detection device 2 is read and the position is classified as to which area of the areas W (1, 1)~W(u, v) in FIG. 3A the particular position belongs to. In step S103 that follows, the present time of the view point t (i, j) is counted for only the area W (i, j) in which the view point is presenting. After that, in step S104, the position of the view point is verified with the signal from the line of sight detection device 2. Then in step S105 that follows, a decision is made as to whether or not the area W(i, j), to which the view point belongs, as verified in step S104, has changed from the area before. If the area W(i, j) has changed, the area for which the present time t(i, j) is counted, is changed to the new area in step S106 and then the operation proceeds to step S107. If the area W(i, j) has not changed, the operation skips step S106 and proceeds to step S107.

In step S107, a decision is made as to whether or not the accumulated counter time on the timer activated in step S101 has reached a specific value. If it has not reached that value, the operation returns to step S103 to repeat the processing described above. If it is determined in step S107 that the time is up, then in step S108, the counting of the present time t(i, j) for each area W(i, j) is stopped, and in step S109 that follows, the dispersion index number E is calculated using the formula given below.

$$E=\Sigma(\alpha(i, j)\times t(i, j)) \ldots (i=1\sim u, j=1\sim v)$$

Figure 3B:
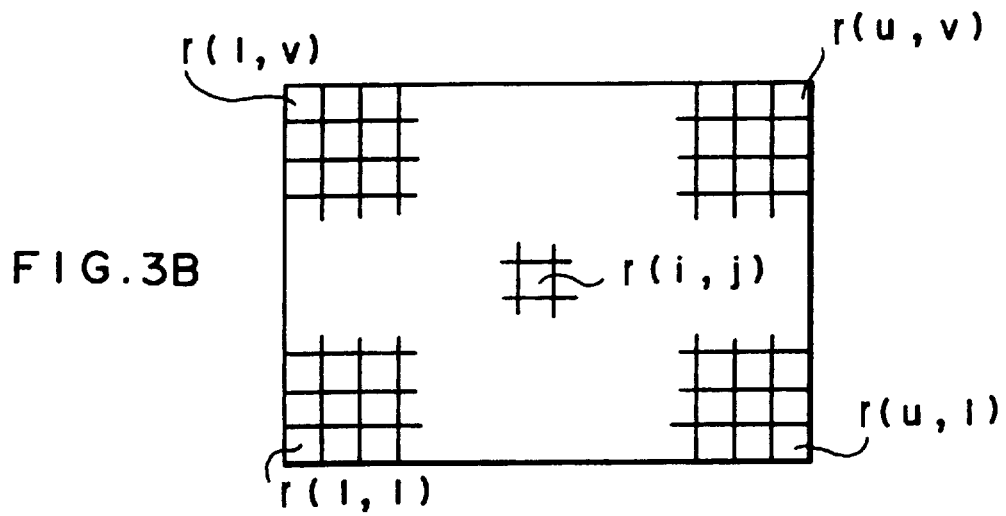
Figure 3C:
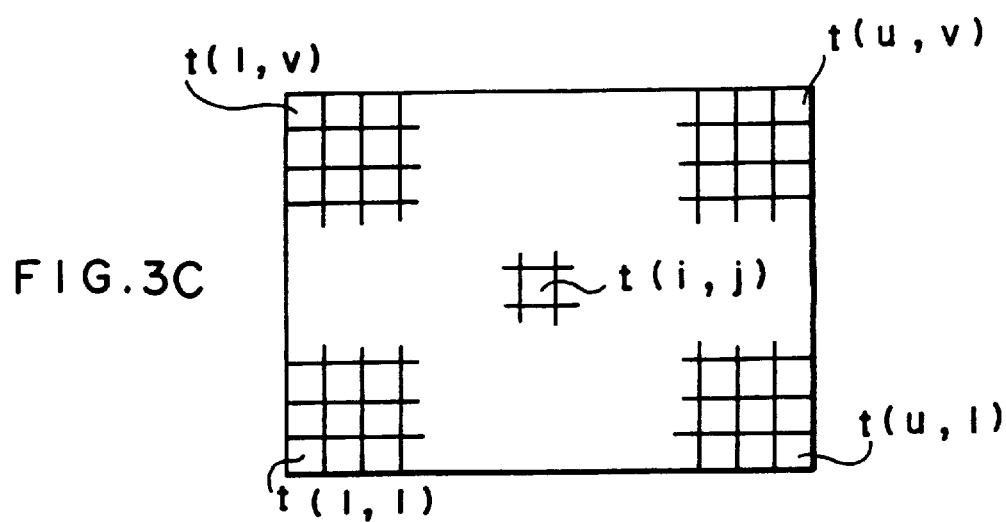

As is obvious from this formula, the dispersion index number E is the total of the products that result from multiplying the present times of the view points t(1, 1)~t(u, v) of each area W(1, 1)~W(u, v), shown in FIG. 3C, by the area coefficient α(i, j) of each area W(i, j) shown in FIG. 3B. When the processing in step S109 is completed, the operation returns to the processing shown in FIGS. 4A and 4B.

Let us explain again by going back to FIGS. 4A and 4B. After the calculation of the dispersion index number E, the operation proceeds to either step S14 or step S15 in which a decision is made as to whether or not the calculated dispersion index number E is equal to or greater than the reference values b, c. If it is equal to or greater than the reference values b, c, the operation proceeds to step S16 and the photographer is informed via the indicator device 9 that the composition is good. On the other hand, if it is determined in step S14 or step S15 that the dispersion index number E is smaller than the reference values b, c, the operation proceeds to step S17 and a warning is issued to the photographer with a buzzer or the like of the indicator device 9. The reference values b, c have a relationship in which b<c.

With the processing described above, since the area coefficient α(i, j) becomes greater as it is further from the center of the photographic field, when the view points of the photographer are concentrated on the central portion of the photographic field, the dispersion index number E, which is calculated in step S12 or step S13, becomes small, and the likelihood of it being judged to be smaller than the reference values b, c in step S14 or step S15 and a warning being issued in step S17 increases. In contrast, if the photographer also observes the periphery of the photographic field evenly, then the dispersion index number E becomes large and the likelihood of it being judged to be greater than the reference values b, c in step S14 or step S15 and the good composition indication being displayed in step S16 increases. If the view points of the photographer are concentrated in the central portion of the photographic field, it means the photographer is observing only on the main photographic subject and is not paying attention to the background, thus the likelihood of the composition being poor is high. Therefore, the warning issued in step S17 functions effectively as the information prompts the photographer to check his composition. When a camera vibration is so great as to make judgment of the composition impossible, a warning is issued in step S17 also.

In this embodiment, since the estimation as to whether or not the composition is poor is made based upon the distribution of the view points of the photographer, the function is not impaired even when the brightness or the contrast is low, which makes the detection of the horizon or the like within the photographic field difficult. In this embodiment, the dispersion index number E also increases when the photographer observes only the periphery of the photographic field, increasing the likelihood of a warning not being issued. However, when the photographer is consciously observing on the periphery of the photographic field, it is reasonable to assume that some sort of intention is involved in the determination of the composition, and therefore, the fact that no warning is issued will present no problem.

In this embodiment, the reference values b, c are changed in correspondence to the numeric relationship between the photographing magnification β and the judgement photographing magnification a and also, b<c. Because of this, even when the degree of dispersion of the view points is approximately even, the likelihood of a warning being issued increases when the photographing magnification β is small, or, β<a (to steps S13 and S15) compared to when β≧a (to steps S12 and S14). This is because the smaller the photographing magnification β becomes, the smaller the area that the main photographic subject occupies in the photographic field becomes, thereby increasing the necessity for verifying the composition by observing the periphery of the photographic field.

The judgement photographing magnification a is changed according to the photographing mode because here again we take into consideration the necessity of observing the periphery of the photographic field. For example, in the portrait mode, the judgement photographing magnification a may be set to a low value because the person who is the main photographic subject occupies a large area and the background is blurred, thus, the necessity for observing the background decreases. Whereas in the landscape mode, it is necessary to set the judgement photographing magnification a to a high value as the necessity for observing every corner of the photographic field increases. The area coefficient at the central portion of the photographic field may also be changed to be greater in the portrait mode than in the landscape mode.

Figure 6:
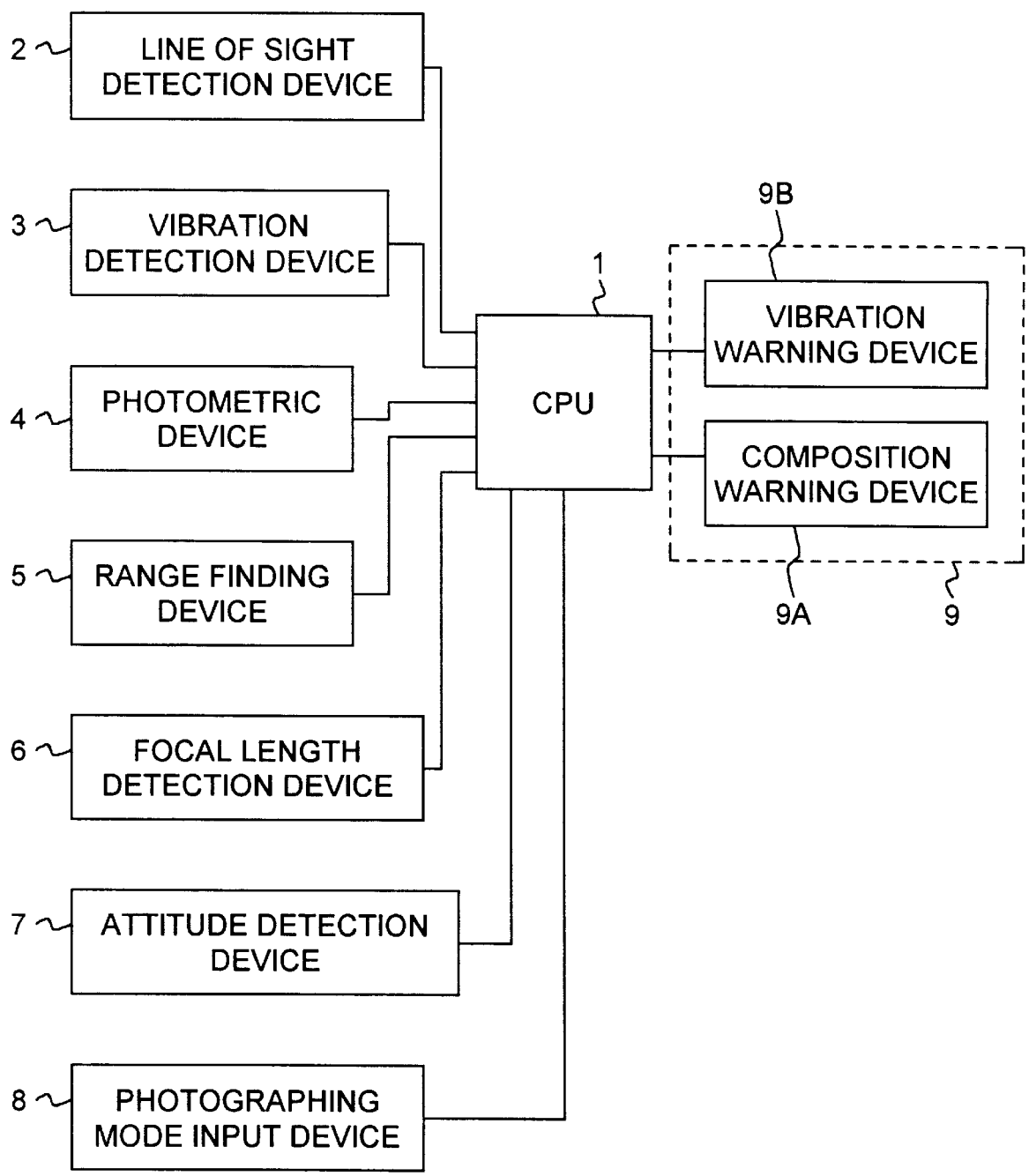
FIG. 6 is a block diagram of the control system in a variation of the example in FIG. 1.
Figure 7:
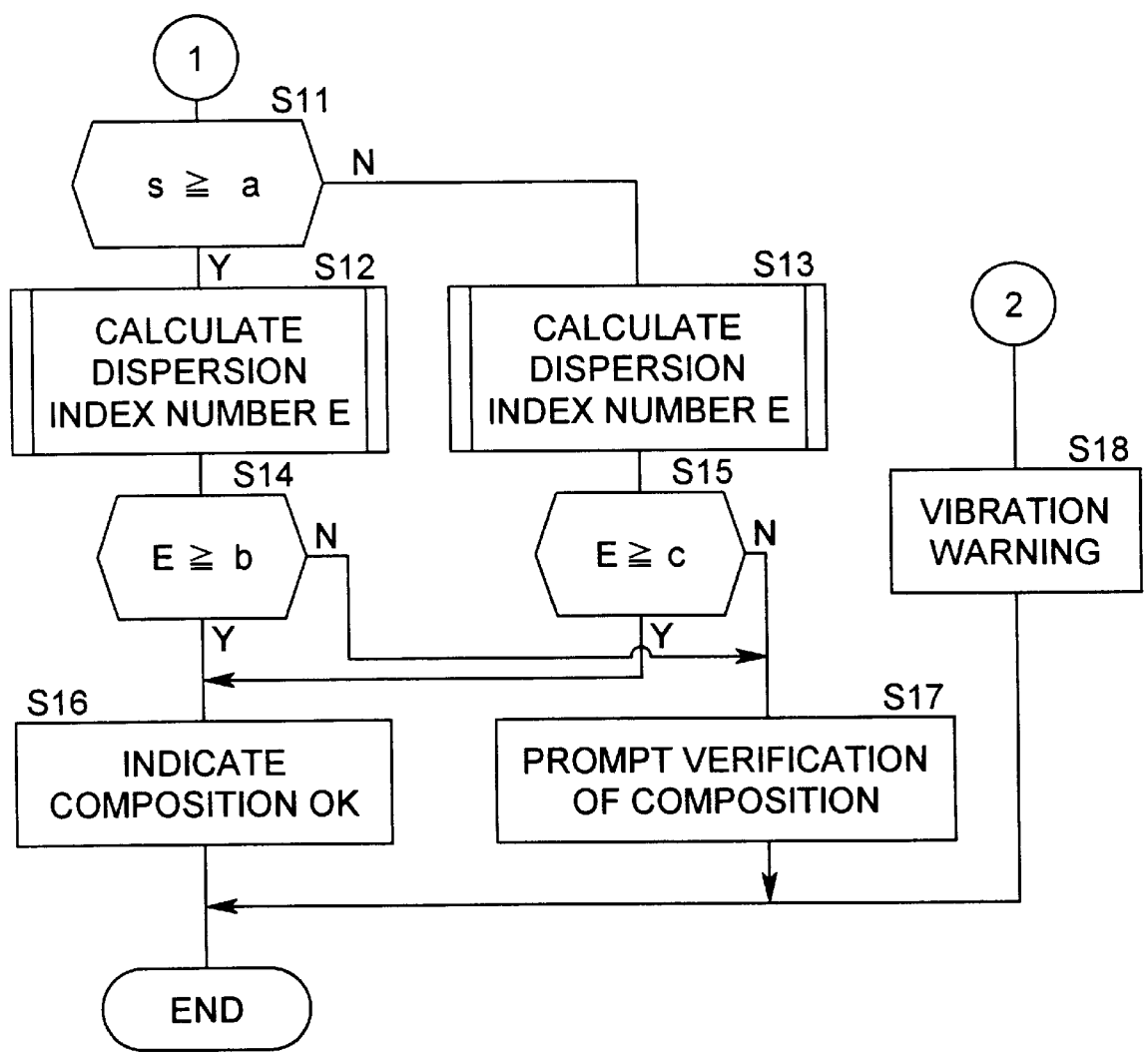
FIG. 7 is a flow chart showing the characteristic portions of the composition estimation procedure that corresponds to FIG. 6.

As shown in FIG. 6, the indicator device 9 may be provided with a composition warning device 9A and a vibration warning device 9B, and, as shown in FIG. 7, when it is estimated that the composition is poor in step S14 or step S15, the operation may proceed to step S17 to prompt verification of the composition through the composition warning device 9A and if it is decided that vibration is excessive in step S7, the operation may proceed to S18 to issue a warning against vibration by the vibration warning device 9B.

Figure 8:
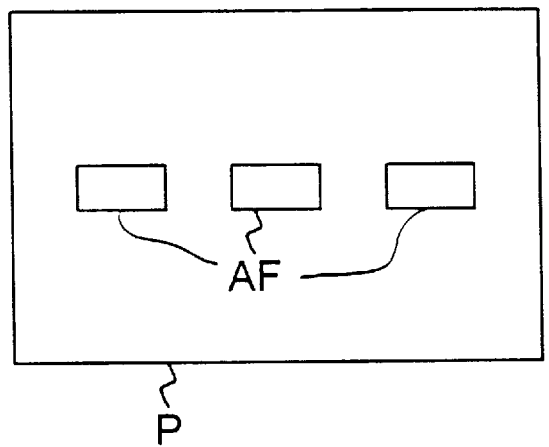
FIG. 8 shows an example in which a plurality of focal point detection areas are present in the photographic field.

It is also possible to increase or decrease the dispersion index number E in correspondence to the degree of dispersion of view points away from the main photographic subject by considering the area where the view points in the photographic field are concentrated most densely within a specific length of time as the position of the main photographic subject and then by setting the area coefficient α(i, j) in such a manner that it becomes greater as it moves away from this particular position. As shown in FIG. 8, with a camera in which a plurality of focal point detection areas AF are set in the photographic field P and in which one of those areas can be selected, the area coefficient α(i, j) may be set in such a manner that it becomes greater as it moves away from the selected focal point detection area AF. In this case, the selection of the focal point detection area AF may be made through instructions from the photographer or may be automatically made by the camera. With a camera which selects the focal point detection area AF based upon the line of sight of the photographer, too, the area coefficient α(i, j) can be set in such a manner that it becomes greater as it moves further away from the selected focal point detection area AF. When the area coefficient α(i, j) is set in such a manner that it becomes greater as it moves further away from the center of the photographic field, regardless of the position of the focal point detection area AF and the focal point detection area AF is selected by the line of sight of the photographer, the line of sight is temporarily concentrated on the selected focal point detection area AF. Therefore, the view point distribution information during that time should be arranged so that it is not taken into the calculation data for the dispersion index number E.

Second Embodiment

The second embodiment according to the present invention is explained in reference to FIGS. 9 through 19. In this embodiment, the composition estimation processing performed by the CPU 1 in the first embodiment described earlier is modified. Therefore, the same key numbers are assigned to components identical to those in the first embodiment and their explanation is omitted. Only the characteristic portions of the composition estimation processing are explained.

Figure 9:
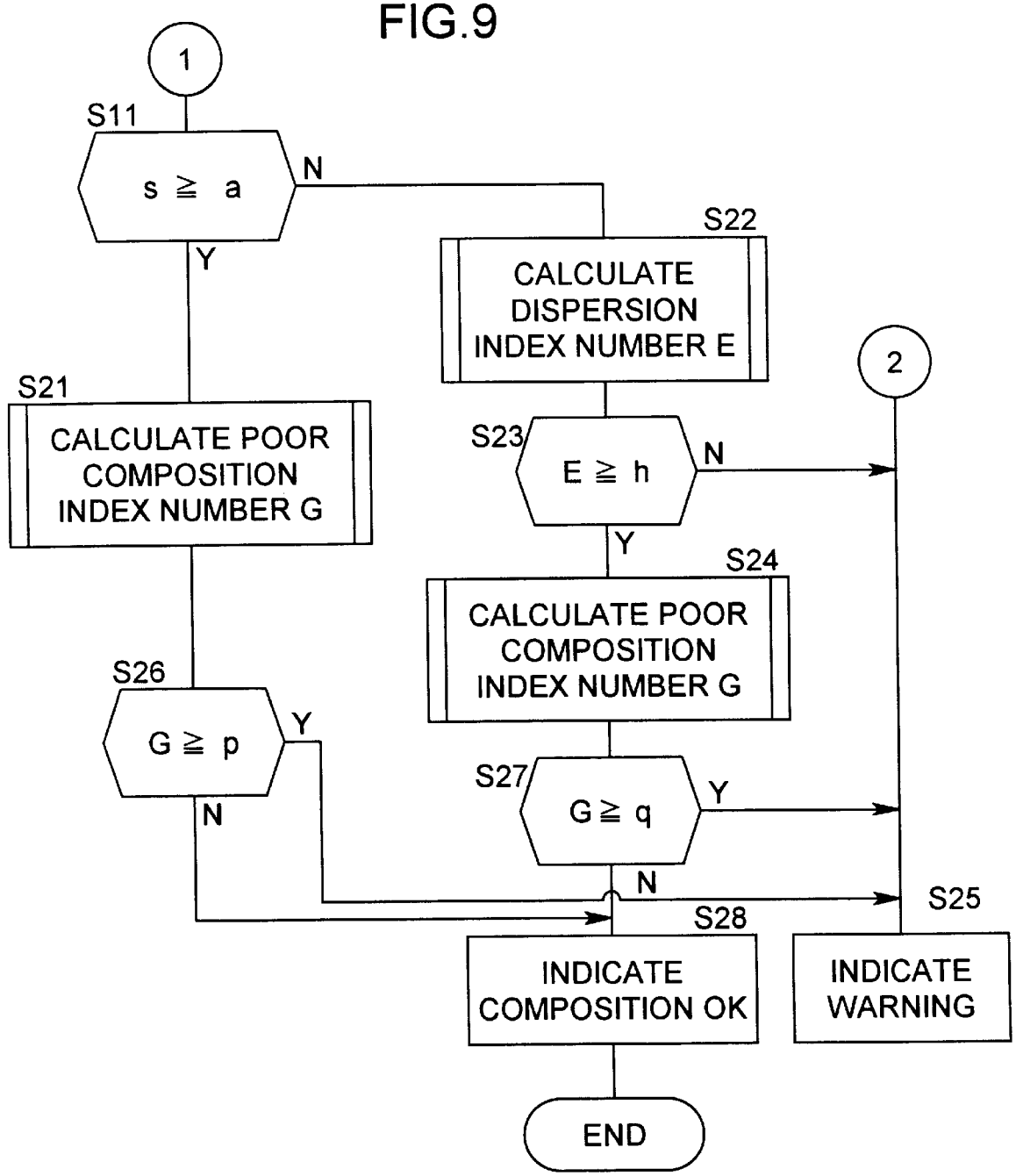
FIG. 9 is a flow chart showing the characteristic portions of the composition estimation procedure in the second embodiment according to the present invention.

FIG. 9 shows a portion of the composition estimation processing performed in this embodiment. Step S11 in the figure is identical to step S11 in the first embodiment and prior to step S11, processing in steps S1~S10 shown in FIG. 4A is executed. If, in step S1 it is determined that the photographing magnification β is greater than the judgement photographing magnification a, the operation proceeds to step S21, in which the index number G that indicates the degree to which the current composition of the photographic field comes under the pre-determined requirements for poor composition (hereafter referred to as the poor composition index number) is calculated, based upon the photometric value Bv for each element PS (refer to FIG. 2) in the photometric device 4. The calculation of this poor composition index number G is described in detail later.

If it is determined in step S11 that the photographing magnification β is less than the judgement photographing magnification a, the operation proceeds to step S22 to calculate the dispersion index number E. The calculation processing for this dispersion index number E is identical to that shown in FIG. 5. After the calculation of the dispersion index number E is complete, the operation proceeds to step S23 to decide whether or not the dispersion index number E is equal to or greater than the reference value h. If the dispersion index number E is equal to or greater than the reference value h, the operation proceeds to step S24 in which the poor composition index number G is calculated. If it is smaller than the reference value h, the operation proceeds to step S25 in which a warning is issued to the photographer with a buzzer or the like, via the indicator device 9. The warning issued at this point is that to which the photographer has not verified the peripheral composition of the photographic field, as was the case in the first embodiment. The judgement photographing magnification a and reference value h here are not necessarily the same as the judgement photographing magnification a and the reference values b, c in the first embodiment.

FIG. 10 shows the calculation processing for the poor composition index number G. In this processing, first a decision is made as to whether or not the camera is being held in the lateral position according to the output from the attitude detection device 7 in step S201. If it is not in the lateral position, the operation proceeds to step S202, in which the number of elements m and the number of elements n of the photometric device 4 shown in FIG. 2, are defined as the constant value n and the constant value m respectively, which are to be used in subsequent processing. When it is in the lateral position, the number of elements m is defined as the constant value m and the number of elements n is defined as the constant value n and they are used unchanged. Such an operation is performed because the CPU 1 handles the horizontal direction of the photographic field as the x axis direction and the vertical direction as the y axis direction, regardless of whether the camera is held in the longitudinal or lateral position. As a result, the numbers of elements in the direction of the x axis and the direction of the y axis of the photometric device 4 are reversed between the two positions.

After the numbers of elements m, n are defined in accordance with the attitude of the camera, the index number (hereafter referred to as the columnar object poor composition index number) G1, which indicates the degree to which a columnar object, such as a telephone pole or a tree, causes poor composition, is calculated in step S203. Then, in step S204, the index number (hereafter referred to as the main photographic subject poor composition index number) G2, which indicates the degree to which the position of the main photographic subject causes poor composition, is calculated. In step S205, the index number G3 (hereafter referred to as the horizontal edge poor composition index number), which indicates the degree to which a horizontal edge that divides the photographic plane into two parts, such as the horizon, causes poor composition, is calculated. These index numbers G1~G3 are set in such a manner that they become higher as the degree to which poor composition is caused becomes greater. A detailed description of the calculation procedure for each index numbers G1~G3 is explained later.

After the calculation of the index numbers G1~G3, the operation proceeds to step S206, in which a total of the index numbers G1~G3, (G1+G2+G3) is calculated as the poor composition index number G. After the calculation of the poor composition index number G, the operation proceeds to step S26 or step S27 shown in FIG. 9, in which a decision as to whether or not the calculated poor composition index number G is equal to or greater than the reference values p, q is made. If it is smaller than the reference values p, q, the operation proceeds to step S28 and the photographer is informed via the indicator device 9 that the composition is good. On the other hand, if the poor composition index number G is equal to or greater than the reference values p, q, in step S26, S27, the operation proceeds to step S25 and a warning is issued to the photographer with a buzzer or the like via the indicator device 9. The reference values p, q have a relationship in which p>q. The processing in step S25 is also executed and a warning is issued, as in the first embodiment, when the vibration of the camera body is significant.

The calculation procedures for the index numbers G1~G3 are explained in reference to FIGS. 11~19.

(1) Calculation processing for the columnar object poor composition index number G1.

Figure 11A:
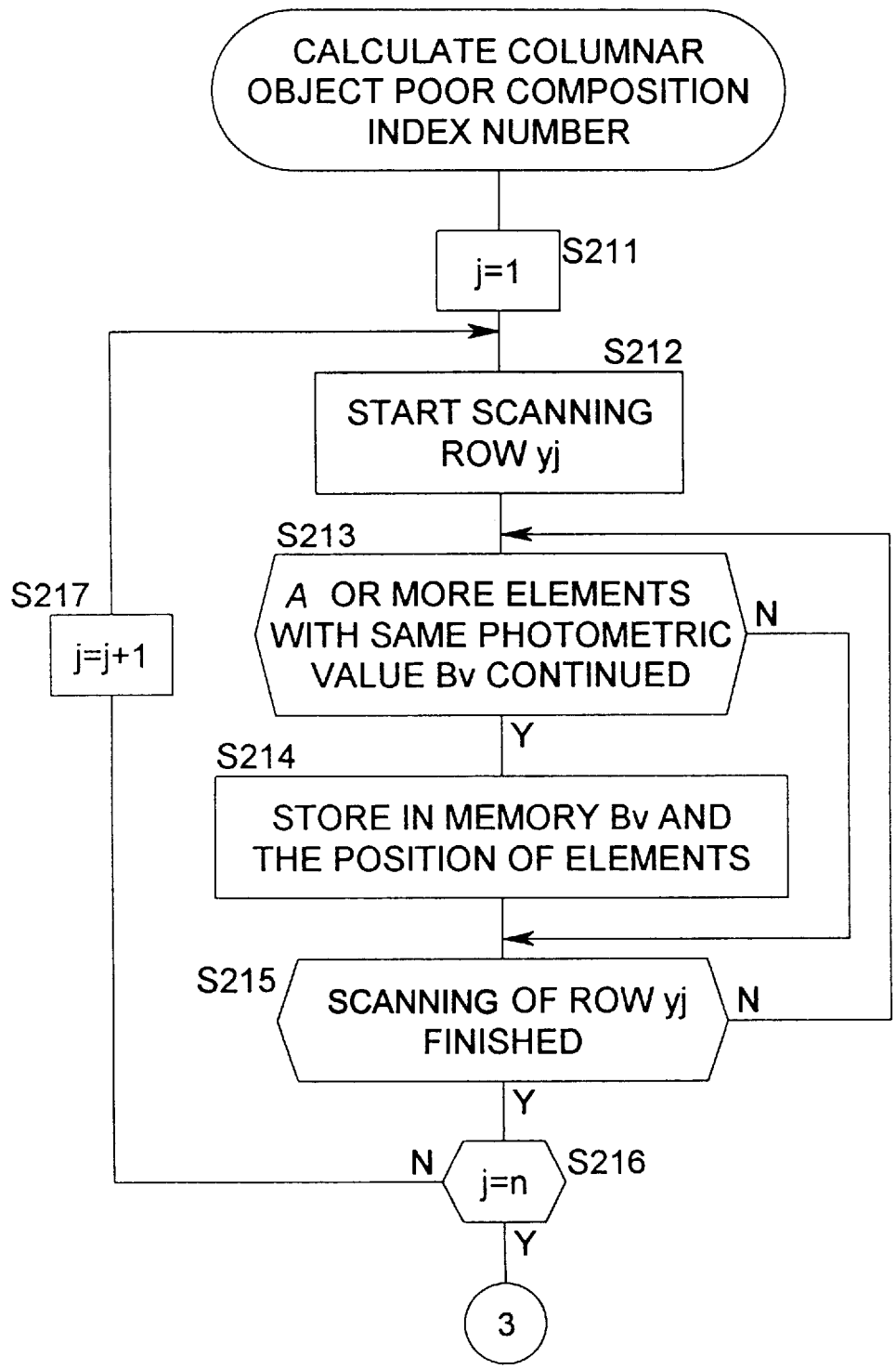
FIGS. 11A through 11C are flow charts showing the details of the calculation procedure for the columnar object poor composition index number G1 in FIG. 10.
Figure 11B:
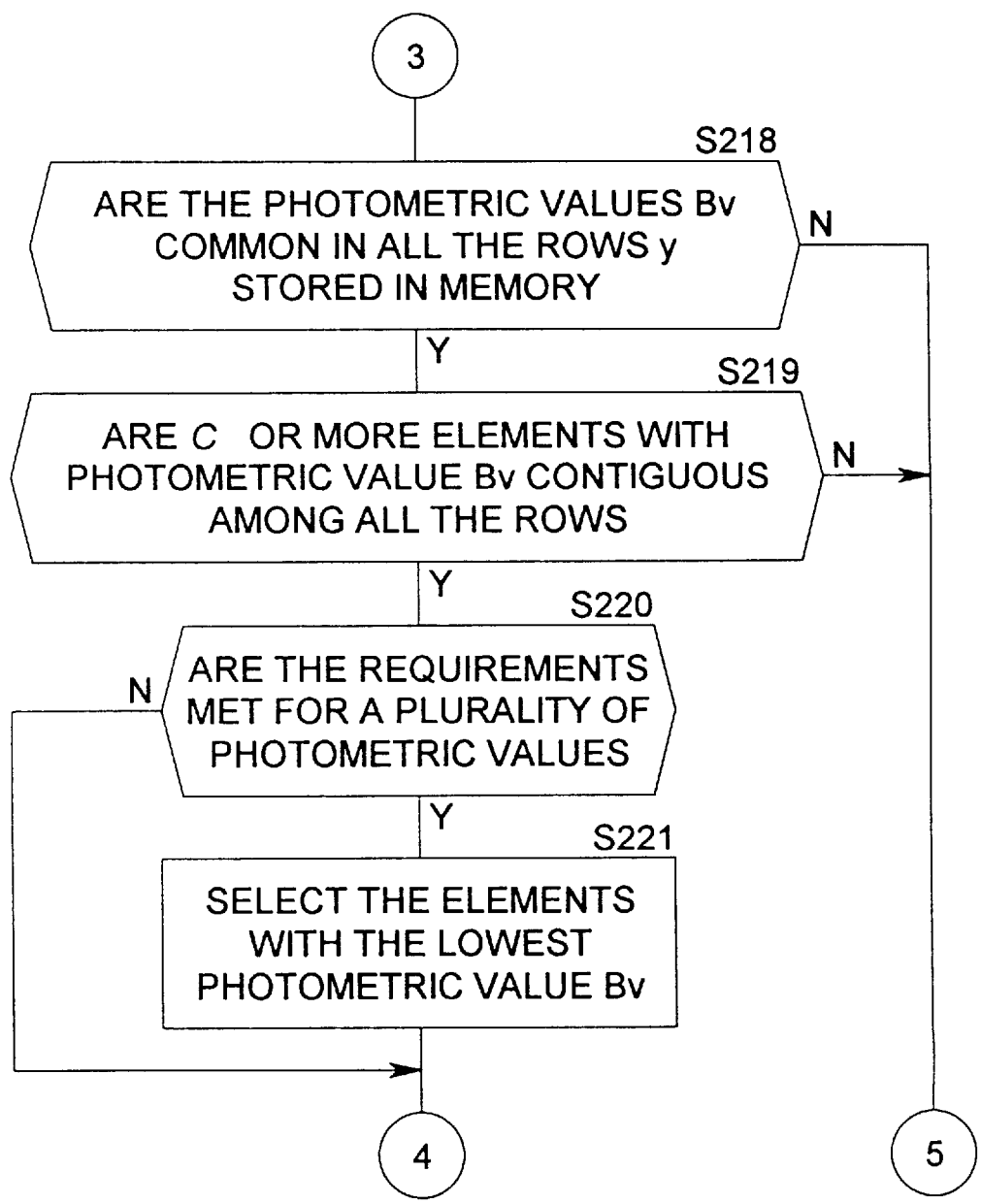
Figure 11C:
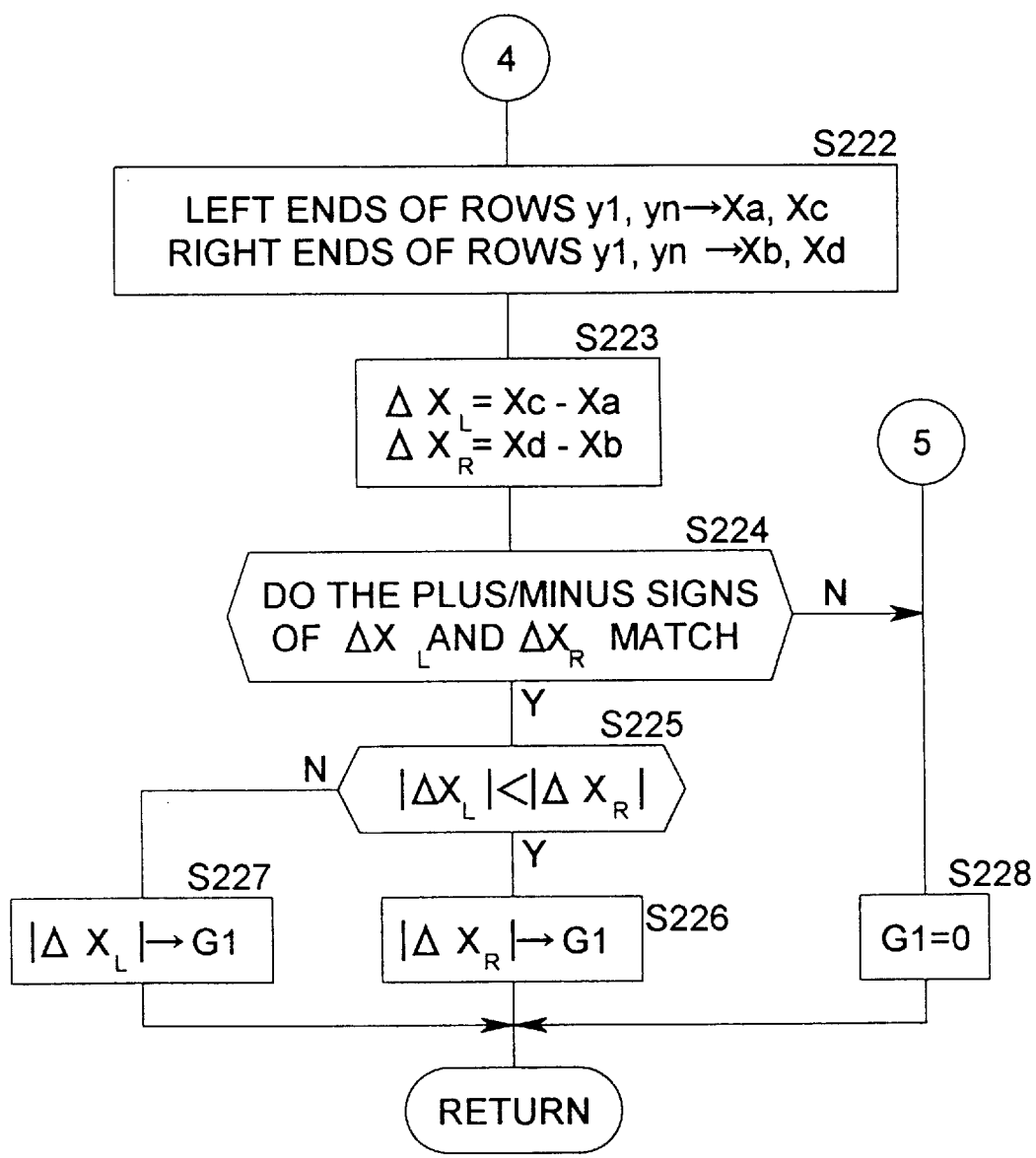
Figure 12A:
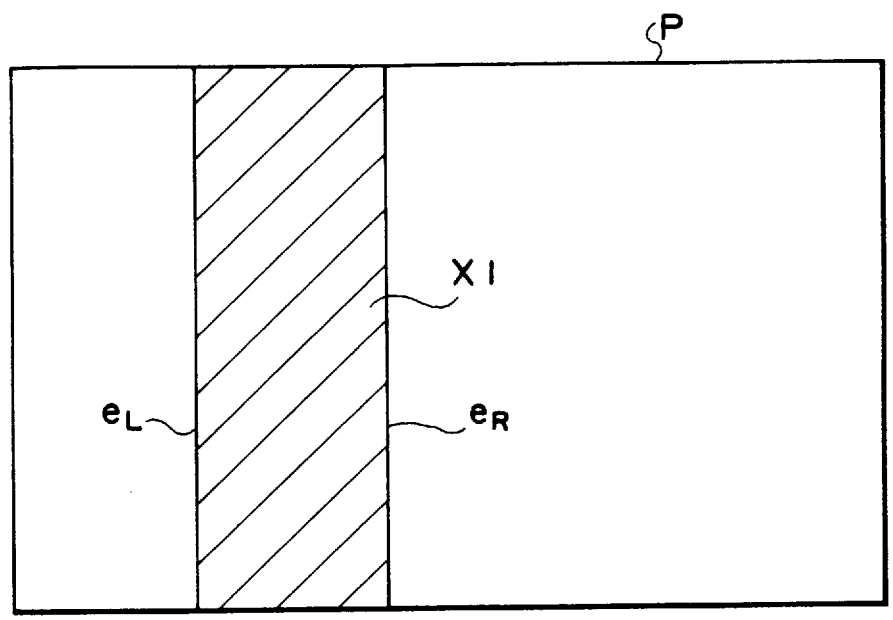
FIG. 12A shows an example in which the position of the columnar object that is present within the photographic field is allowable.
Figure 12B:
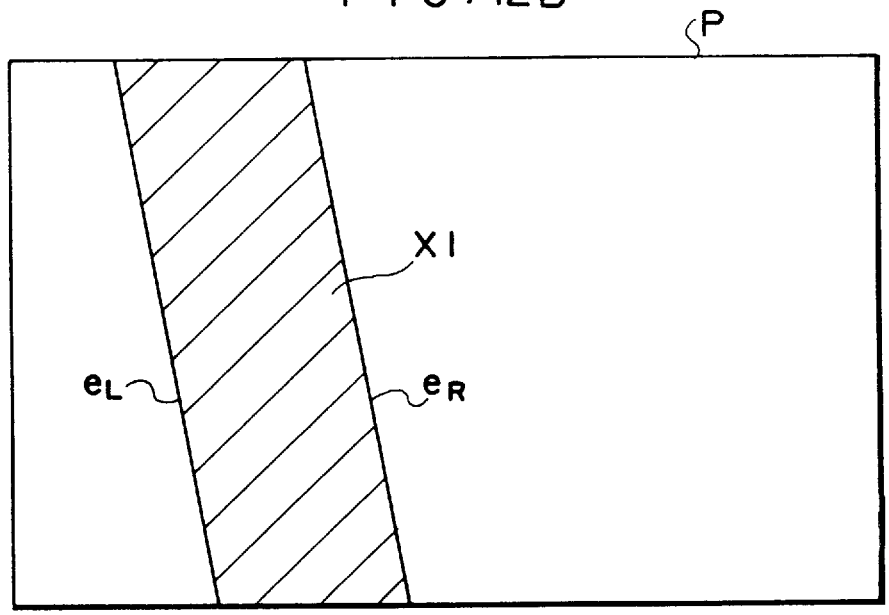
FIG. 12B shows an example in which the position of the columnar object that is present within the photographic field is not allowable.
Figure 13:
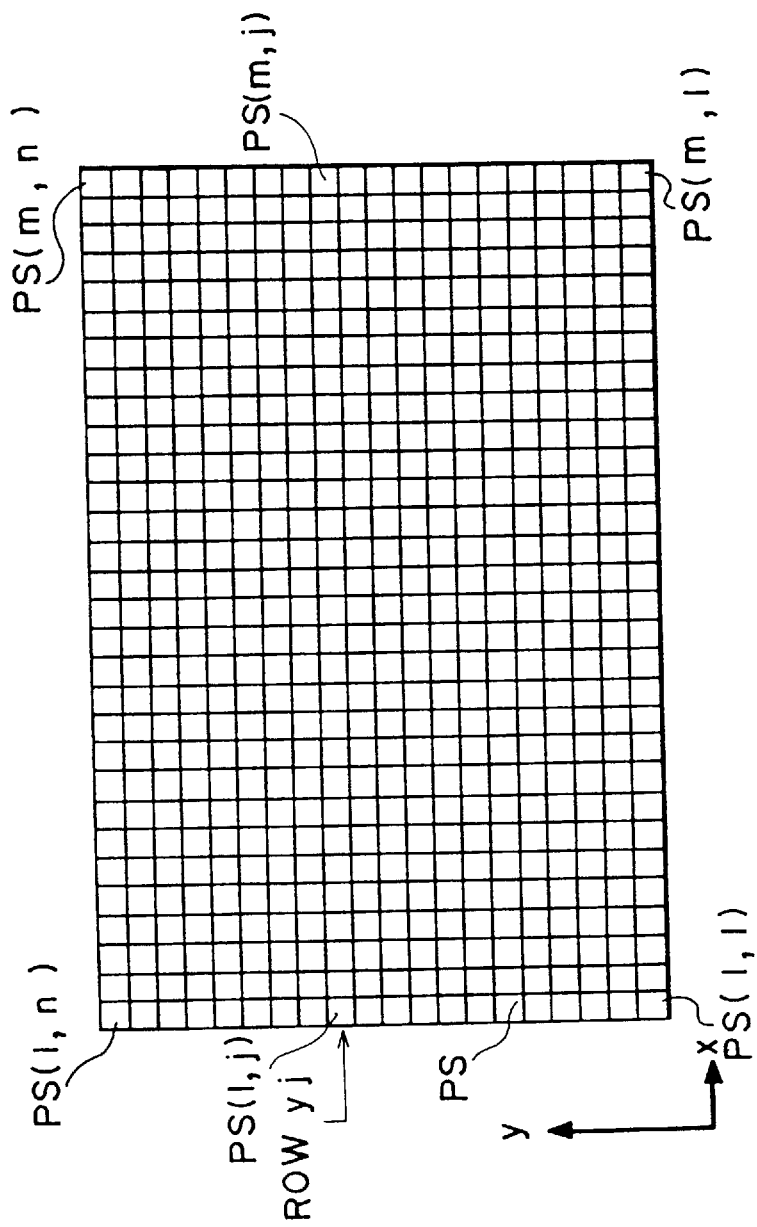
FIG. 13 shows an example of an arrangement of the elements of the photometric device 4.

FIGS. 11A, 11B and 11C show the calculation procedure for the columnar poor composition index number G1. As shown in FIG. 12A, when a columnar object (tree, telephone pole, column, etc.) X1 which should be photographed so that it extends strait up, in the vertical direction in the photographic field, is photographed on a slant as shown in FIG. 12B, it results in a poor composition. In order to reflect such factors in the estimation of poor composition, in the processing shown in FIGS. 11A~11C, the columnar object X1 in the photographic field is recognized based upon the distribution of the photometric values detected by the photometric device 4 and the degrees to which the edges (boundaries with the background) eL, eR of the columnar object X1 are inclined are converted to index number. In the following explanation, the row of the elements that share the same x coordinate among the elements PS in the photometric device 4 is expressed as the row y, and the row y which is the jth row upward from the bottom in the direction of the y axis, is expressed as the row yj. FIG. 13 shows an example in which the camera is held in the lateral position and the numbers of the elements PS are m=30 and n=20.

As shown in FIG. 11A, in the calculation of the index number G1, the variable j for specifying a row to be scanned is set at the initial value of 1 in step S211 and in step S212 the scanning of the photometric values of the elements PS (1, j)~PS (m, j) in the row yj is started. In step S213 that follows, a decision is made as to whether or not the elements PS that share the same photometric value Bv continue for a specific number A or more in the row yj. If they continue, then the operation proceeds to step S214 and the photometric value Bv and the position of the group of elements that fit the requirements of step S213 are stored in memory. If no group of elements that satisfies these requirement is present, then the operation skips step 214 and proceeds to step S215.

In step S215, a decision is made as to whether or not the scanning of the row yj has been completed and if the scanning is still in progress, the operation returns to step S213. If the scanning of row yj has been completed, the operation proceeds to step S216 (FIG. 11B), in which a decision is made as to whether or not the variable j matches the number of elements n in the direction of the y axis. If it does not match, then in step S217, one is added to the variable j and the operation returns to step S212. If the variable j matches the number of elements n, the operation proceeds to step S218.

In step S218, a decision is made as to whether or not any one of the photometric values Bv stored in memory in step S214 is common to all the rows y (row y1~row yn). When making the decision in step S213 and in step S218 as to whether or not the photometric values Bv of the various elements PS are equal, as long as the difference between the photometric values Bv is within a specific allowable range, they may be handled as equal.

When a photometric value Bv that is common to all the rows y exists, the operation proceeds to step S219 and a decision is made as to whether or not a specific number of C or more of elements whose photometric value is Bv are contiguous among all the rows y. If this requirement is met, the operation proceeds to step S220 and a decision is made as to whether or not the aforementioned requirement is met for a plurality of photometric values Bv. If this requirement is met for a plurality of photometric values, the operation proceeds to step S221 and the group of elements with the lowest photometric value is selected as the object of subsequent processing. For example, if two groups of elements with photometric values Bv1 and Bv2 (Bv1<Bv2) are stored in memory in step S214, and at the same time, both groups of elements with photometric values Bv1 and Bv2 satisfy the requirements in step S218 and step S219, the group of elements with the photometric value Bv1 stored in memory in step 214 is selected as the object of processing. If a negative decision is made in step S220, step S221 is omitted and the group of elements with the photometric value Bv stored in memory in step S214 is selected as the object of processing.

After the group of elements with the photometric value Bv is selected, the operation proceeds to step S222 (FIG. 1C). In step S222, of those elements with the photometric value Bv that have been selected, the x coordinates of the elements which are positioned at the leftmost in the row y1 and the row yn are defined as Xa and Xc respectively, and the x coordinates of the elements that are positioned rightmost in the row y1 and the row yn are defined as Xb and Xd respectively. The row y1 is the row of elements that is positioned at the lower end of the photographic field and the row yn is the row of elements that is positioned at the upper end of the photographic field. In step S223 that follows, the amounts of deviation $\Delta X_L$ and $\Delta X_R$ at the left and right ends are calculated for the elements with the photometric value Bv in the row y1 and in the row yn using the formulae below.

$$\Delta X_L = Xc - Xa$$

$$\Delta X_R = Xd - Xb$$

In step S224, a decision is made as to whether or not the plus/minus signs of $\Delta X_L$ and $\Delta X_R$ match. If they match, the operation proceeds to step S225 in which a decision is made as to whether or not the absolute value of $\Delta X_L$ is smaller than the absolute value of $\Delta X_R$. If it is smaller, the operation proceeds to step S226 and the index number G1 is set in correspondence to the absolute value of $\Delta X_R$. If the absolute value of $\Delta X_L$ is greater than that of $\Delta X_R$, then the operation proceeds to step S227 to set the index number G1 in correspondence to the absolute value of $\Delta X_L$. The greater the values of $\Delta X_L$, $\Delta X_R$, the greater value is set for the index number G1. It is also possible to increase the index number G1 proportionately to $\Delta X_L$, $\Delta X_R$ or to increase the index number G1 as an increasing function (quadratic or more) against $\Delta X_L$, $\Delta X_R$.

If negative decisions are made in steps S218, S219 and S224, the operation proceeds to step S228 in which zero is set for the index number G1. After the processing in steps S226~S228 is over, the operation returns to the processing shown in FIG. 10.

Next, an actual example of the processing shown in FIGS. 11A~11C is explained in reference to FIG. 14. The arrangement of the elements of the photometric device 4 is as shown in FIG. 13 and the specific number of elements A in step S213 is 5 and the specific number of elements C in step S219 is 4.

FIG. 14 shows the correspondence between the photographic field P shown in FIG. 12B and the arrangement of the elements PS of the photometric device 4. Since, generally speaking, the brightness of the columnar object X1 is lower than that of the background area, it is assumed that in the elements which are positioned on the columnar object X1, a consistent photometric value Bv1 which is lower than that in the background area is detected and that in the elements positioned on the background, a consistent photometric value Bv2 which is higher than the photometric value Bv1 is detected. In a state in which the photographing distance to the columnar object X1 is short and the photo-taking lens is focused on it, we can assume that the background is consistently light because the background area is beyond the depth of field and becomes unfocused.

When the processing shown in FIGS. 11A~11C is applied to the photographic field shown in FIG. 14, in steps S211~S215, the elements PS (1, 1)~PS (7, 1) are stored in memory as the group with the same photometric value Bv2, the elements PS (9, 1)~PS (14, 1) are stored in memory as the group with the same photometric value Bv1 and the elements PS (16, 1)~PS (30, 1) are stored in memory as the group with the same photometric value Bv2 for the row y1. After this, identical processing is repeated for the rows y2~y20 and the elements PS (1, 20)~PS (4, 20) are stored in memory as the group with the same photometric value Bv2, the elements PS (6, 20)~PS (11, 20) are stored in memory as the group with the same photometric value Bv1 and the elements PS (13, 20)~PS (20, 20) are stored in memory as the group with the same photometric value Bv2, for the row y20.

Since there are the photometric values Bv1 and Bv2 which are common to the rows y1~y20, and the number of elements with photometric value Bv1 that are contiguous among the rows y and the number of elements with the photometric value Bv2 that are contiguous among the rows y are, without exception, equal to or greater than C (=4) from the row y1 though the row y20, affirmative decisions are made in both step S218 and step S219. Then in step S220, since the photometric value Bv1<Bv2, the group of elements with the photometric value Bv1 is selected as the object of processing. In step S221, the x coordinates of the elements with photometric value Bv1 at the left and right ends in the row y1 and the row y20 are selected and, as a result, Xa=9, Xb=14, Xc=6 and Xd=11. In step S223, $\Delta X_L$=6−9=−3 and $\Delta X_R$=11−14=−3. As the plus/minus signs of $\Delta X_L$ and $\Delta X_R$ are both negative, an affirmative decision is made is step S224. Since the absolute values of $\Delta X_L$ and $\Delta X_R$ are equal, an affirmative decision is made in step S225, then, in step S226, the index number G1 is set in correspondence to the absolute value of $\Delta X_L$ (=3).

As is clear from the explanation above, in the processing shown in FIGS. 11A~11C, a decision is made as to whether or not a columnar object X1 that divides the photographic field vertically into left and right portions based upon whether or not the elements with the same photometric value Bv are continuously present for the specific number of elements A or more in the horizontal direction of the photographic field and also depending upon whether or not the elements with the same photometric value Bv are contiguous for the specific number of elements C or more among the individual rows y. If a columnar object X1 is present, the amounts of deviation $\Delta X_L$, $\Delta X_R$ at the edges eL, eR (refer to FIGS. 12A and 12B) of the columnar object X1 at the upper and lower ends of the photographic field are calculated and the index number G1 is set in correspondence to the greater value of the two. Therefore, the index number G1 indicates the degree to which the inclination of the columnar object affects a poor composition judgement. In the case of a structure in which the width changes with the height, such as a cone, as its edges incline even if the structure stands vertical in the photographic field, there is a likelihood that a poor composition judgment will be made erroneously if only one edge is evaluated. However, in the processing shown in FIGS. 11A~11C, a decision is made as to whether or not the directions of inclination of the edges at both ends of the columnar object match in step S224, eliminating such a likelihood.

(2) Calculation processing for the main photographic subject poor composition index number G2

Figure 15A:
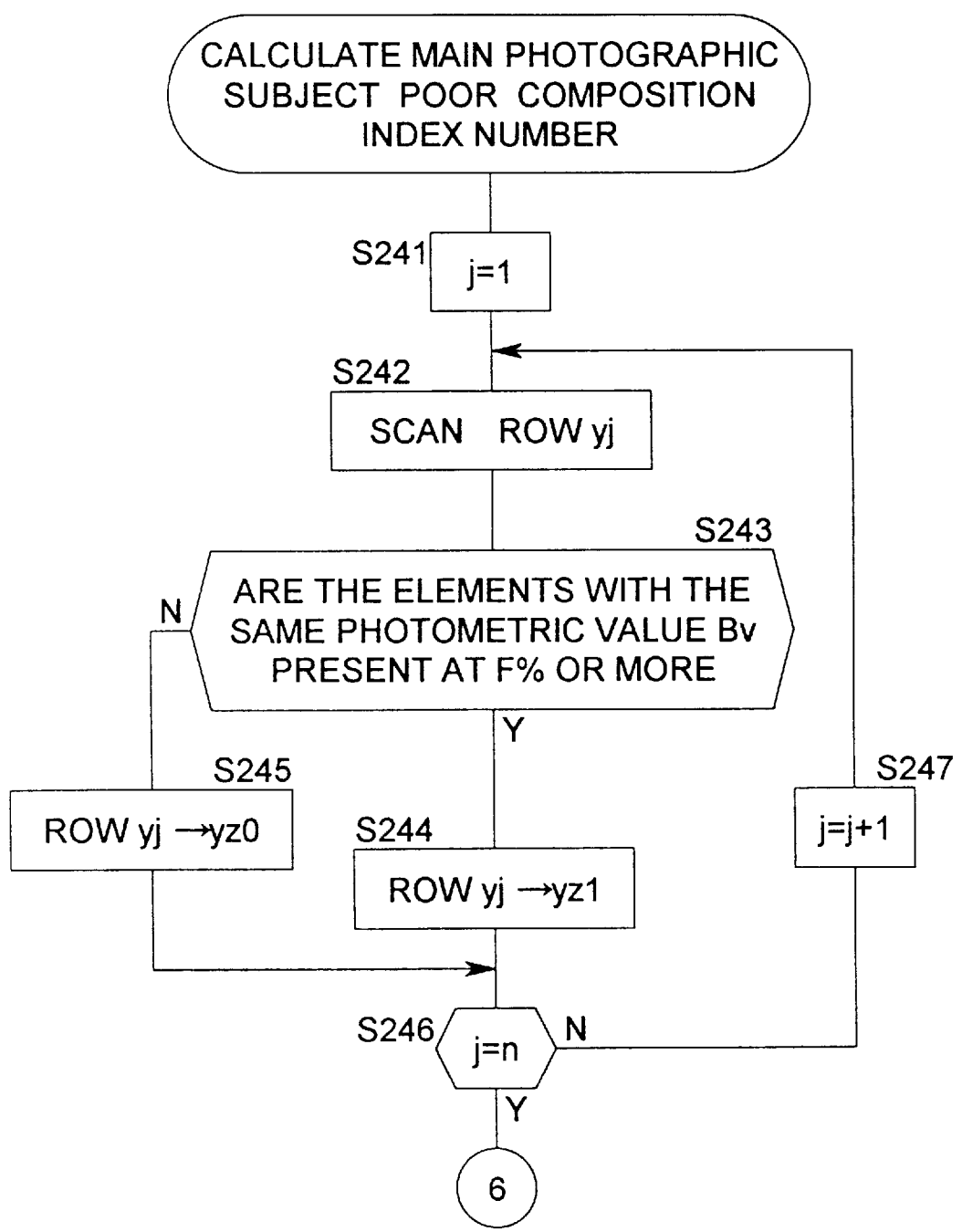
FIGS. 15A and 15B are flow charts showing the details of the calculation procedure for the main photographic subject poor composition index number G2 in FIG. 10.
Figure 15B:
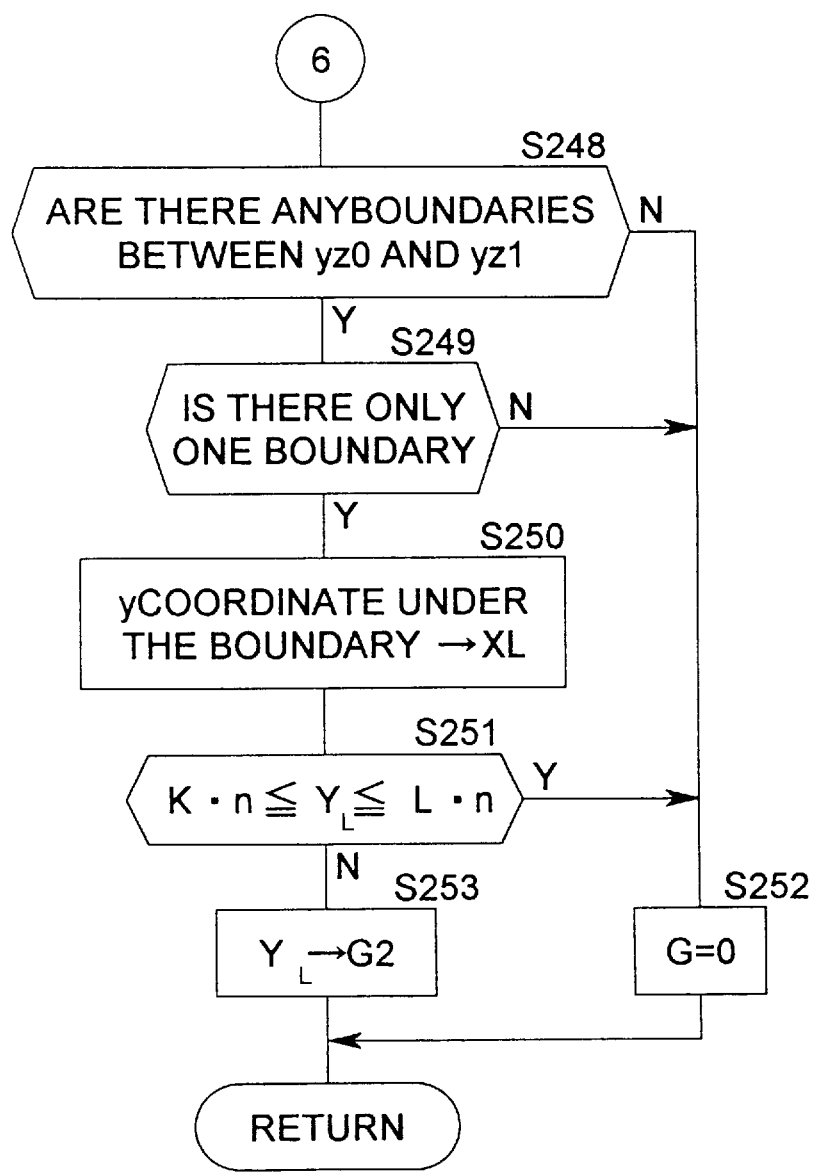
Figure 16A:
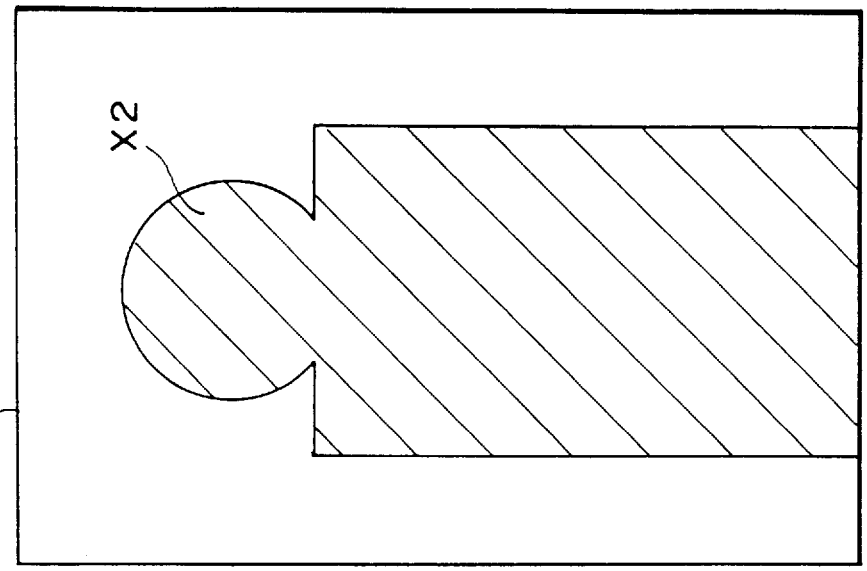
FIG. 16A shows an example in which the position of the main photographic subject that is present within the photographic field is allowable.
Figure 16B:
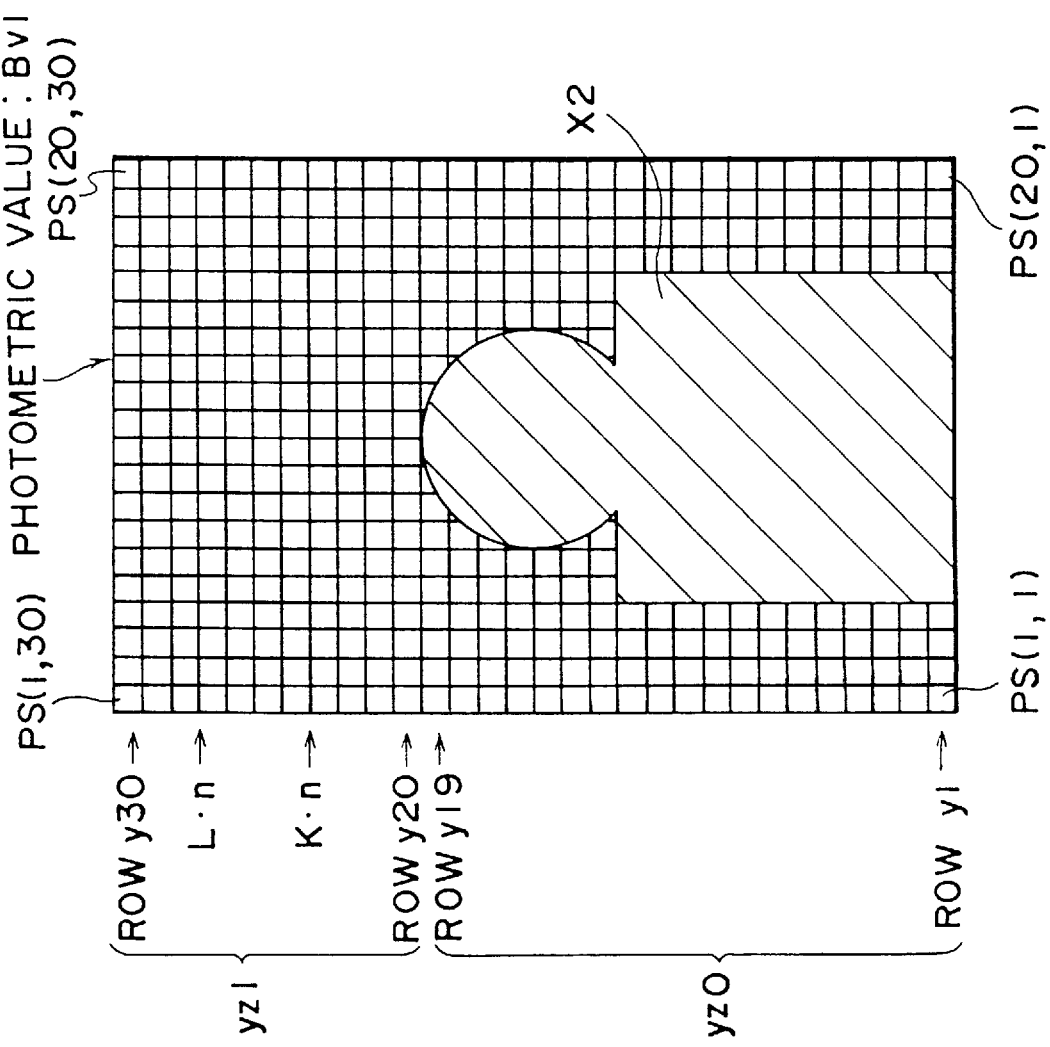
FIG. 16B shows an example in which the position of the main photographic subject that is present within the photographic field is not allowable.

The calculation processing for the main photographic subject poor composition index number G2 (step S204 in FIG. 10) is explained in reference to FIGS. 15 and 16. As shown in FIG. 16A, when the main photographic subject (a person in this example) X2 in the photographic field P is far away from the upper end of the photographic field P as shown in FIG. 16B or if the situation is reversed and the main photographic subject is too close to the upper end of the photographic field P, it causes a poor composition. In order to reflect such factors in the estimation of poor composition, in the processing shown in FIGS. 15A and 15B, the position of the upper end of the main photographic subject is detected based upon the distribution of photometric values detected by the photometric device 4 and the amount of deviation from its allowable range is converted to an index number. In the following explanation, the rows of elements that share the same x coordinates among all the elements PS of the photometric device 4 are referred to as the rows y, and the row y that is the jth row from the bottom in the direction of the y axis is expressed as the row yj.

As shown in FIG. 15A, in the calculation of the index number G2, first the variable j, for specifying the row to be scanned, is set to the initial value of 1 in step S241, and in step S242, the photometric values of the elements PS(1, j)~PS(m, j) in the row yj are scanned. In step S243 that follows, a decision is made as to whether or not the number of elements PS with the same photometric value Bv in the row yj accounts for F% or more of the total number of elements m in the row yj. If there are that many or more, the operation proceeds to step S244, in which the row yj is defined as the row of elements yz1 and then the operation proceeds to step S246. If the requirement in step S243 is not satisfied, the operation proceeds to step S245 in which row yj is defined as the row of elements yz0 and then the operation proceeds to step S246. When determining whether or not the elements have the same photometric value Bv, a specific allowable range may be set as in the example shown in FIGS. 11A~11C.

In step S246, a decision is made as to whether or not the variable j matches the number of elements n in the direction of the y axis. If it does not match, then in step S247, one is added to the variable j and the operation returns to step S242. If it matches, the operation proceeds to step S248, in which a decision is made as to whether or not the boundary between the rows of elements yz0 and yz1 is present within the photographic field. If it is present, the operation proceeds to step S249, in which a decision is made as to whether or not there is only one boundary. If there is only one, the operation proceeds to step S250, in which the y coordinate of either one of the two rows y that are adjacent to each other across the boundary position, is defined as the boundary coordinate YL. In this embodiment, the Y coordinate of the row y, which is on the lower side of the boundary, is defined as the boundary coordinate. In step S251 that follows, a decision is made as to whether or not the boundary coordinate YL is within the allowable range according to the relationship:

$$K \cdot n \leq YL \leq L \cdot n$$

If the above relationship is satisfied, the operation proceeds to step S252, in which the index number G2 is set to 0. On the other hand, if the relationship above is not satisfied, the operation proceeds to step S253 to set the index number G2 in correspondence to the coordinate YL. When doing this, the greater the deviation of the coordinate YL from the allowable range, shown in the relationship above, the greater the value set for the index number G2. After the processing in steps S252, S253, the operation returns to the processing shown in FIG. 10. The F% is determined in correspondence to the number of elements of the photometric device 4 in the direction of the x axis and it is desirable to set it at a value as close as possible to 100%. The coefficients K, L give the allowable range for the distance between the upper end of the photographic field and the upper end of the main photographic subject, and in regular portrait photography, the ideal values for K and L are approximately K=0.8 and L=0.9.

An actual example of the processing shown in FIGS. 15A and 15B is explained in reference to FIG. 16B. FIG. 16B shows the correspondence between the elements PS and the photographic field P in the case that the camera is held in the longitudinal position and the numbers of elements PS of the photometric device 4 are n=30 and m=20. The area shaded with diagonal lines in the figure indicates the main photographic subject X2. As for the handling of the numbers of elements in the longitudinal position, it is as has already been explained in the explanation of step S202 in FIG. 10. Since the background area that is not the main photographic subject X2 is beyond the depth of field and becomes unfocused, it can be assumed that the elements that correspond to the background area will have a consistent photometric value Bv1 which is lighter than that of the elements that correspond to the main photographic subject X2. Also, F is set at 100.

When the processing shown in FIGS. 15A and 15B is applied in the case of the photographic field shown in FIG. 16B, in the rows y1~y19, it is not possible for the elements PS with the same photometric value Bv1 to be present at F(=100)% since the main photographic subject X2 and background are present together in those rows, therefore, a negative decision is made in step S243. Because of this, the rows y1~y19 are defined as the rows of elements yz0 in step S245. In the rows y20~y30, since there is only the background present, the elements with the same photometric value Bv1 are present at F% or more and consequently an affirmative decision is made in step S243. As a result, the rows y20~y30 are defined as the rows of elements yz1 in step S244. Then, since there is only one boundary present between the rows of elements yz0 and the rows of elements yz1, affirmative decisions are made in steps S248 and S249, thus in step S250, the Y coordinate "19" of the row y19, which is the upper limit of the rows of elements yz0 is defined as the boundary coordinate YL.

In step S251 that follows, if K=0.8 and L=0.9, then K·n=24 and L·n=27, and then YL<K·n, thus it is determined that the boundary coordinate YL is not within the allowable range. As a result, the index number G2 is set in correspondence to the difference between the boundary coordinate YL and the K·n in step S253.

As is clear from the above explanation, in the processing shown in FIGS. 15A and 15B, a decision is made as to whether or not the main photographic object and the background are present together in each row y based upon whether or not the same photometric value Bv is present in that particular row y at F% or more, and the boundary between of the rows of elements yz0 in which they are present together and the rows of elements yz1 in which they are not present together, is regarded as the upper end of the main photographic subject. If the upper end of the main photographic subject is not within the allowable range, the index number G2 is set in correspondence to the amount of deviation from the allowable range. Thus, the index number G2 adequately indicates the degree to which the position of the main photographic subject is inappropriate. When photographing the upper half of a person or some similar subject, it is not possible that the elements that correspond to the background are present at close to 100% in the area that is lower than the main photographic subject, and because of this, an erroneous decision as to whether or not it is the main photographic subject is prevented in step S249.

(3) Calculation processing for the horizontal edge poor composition index number G3

Figure 17A:
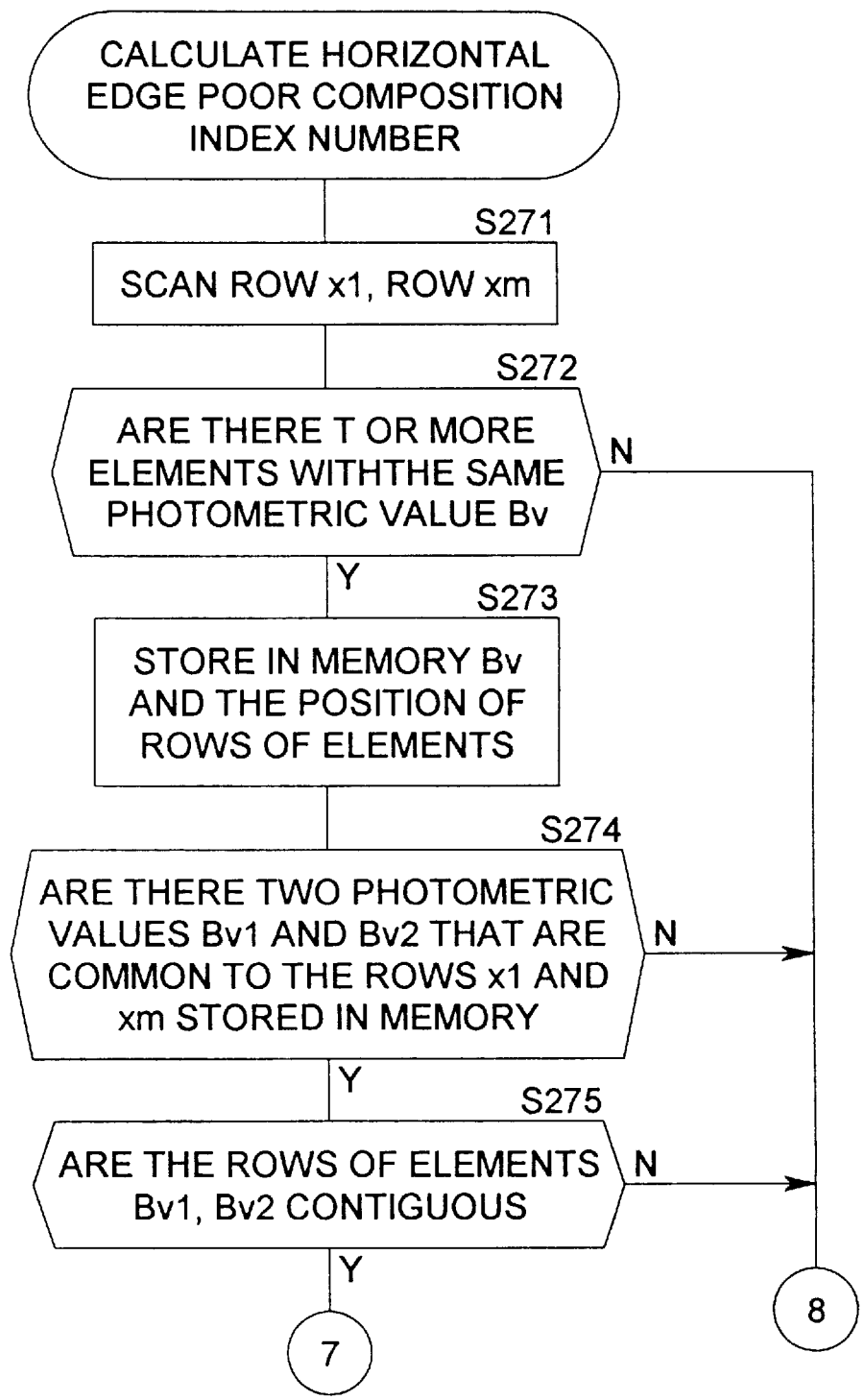
Figure 17C:
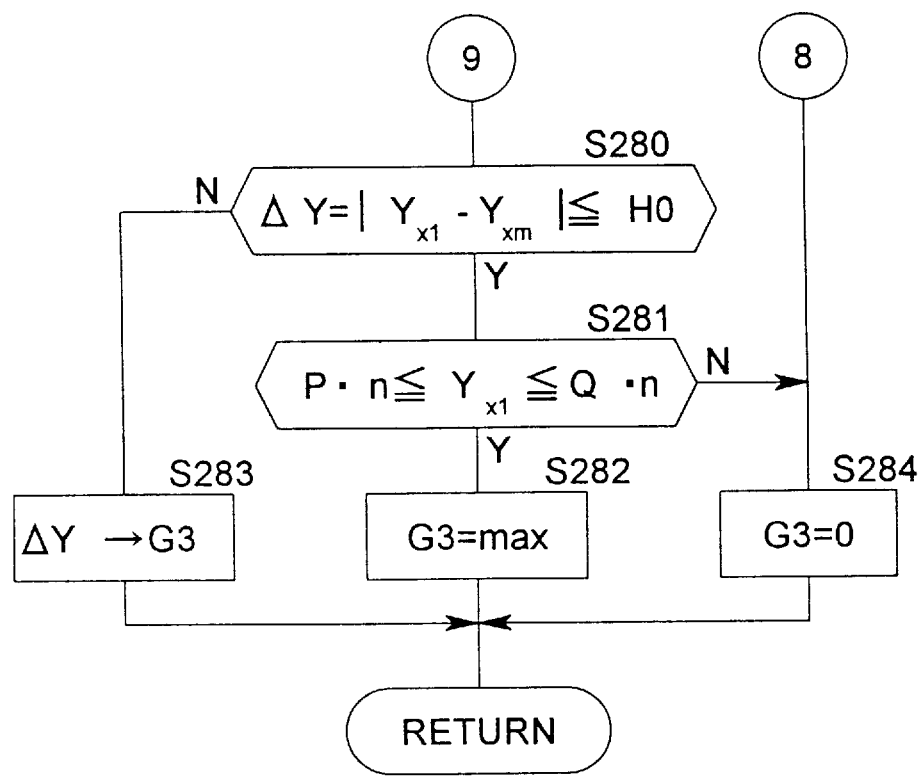
Figure 18:
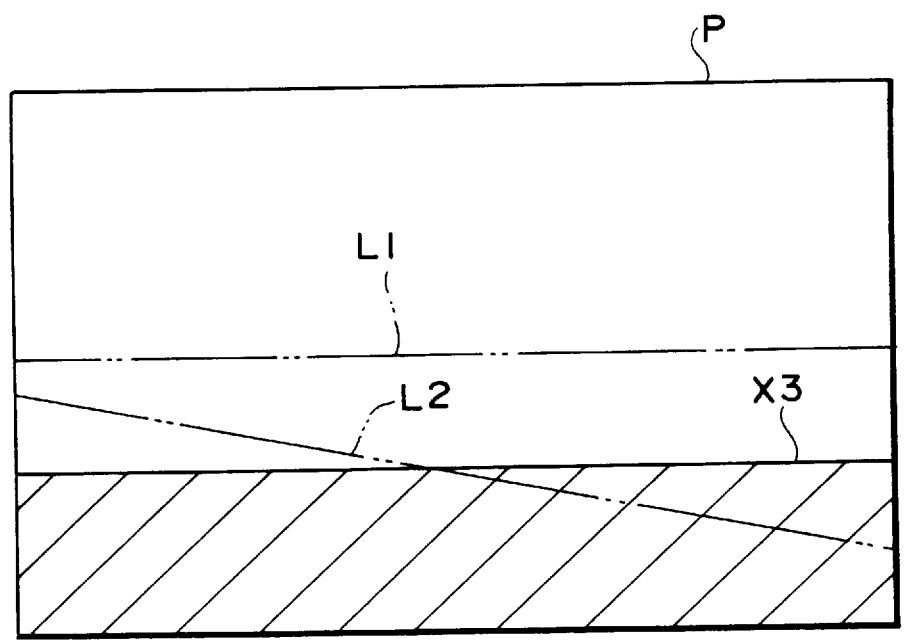
FIG. 18 shows an example of a composition in which the horizon is taken in the photograph.

The calculation processing for the horizontal edge poor composition index number G3 (step S205 in FIG. 10) is explained in reference to FIGS. 17~19. As shown in FIG. 18, if the edge X3 that divides the photographic field P into upper and lower portions goes across the center of the photographic field P, as shown by the two-point chain line L1, or if the edge X3 inclines from the horizontal direction of the photographic field, as shown by the two-point chain line L2, then a poor composition is generated. In order to reflect such factors on the estimation of poor composition, in the processing shown in FIGS. 17A~17C, the horizontal edge X3 in the photographic field is recognized based upon the distribution of photometric values detected by the photometric device 4 and the degree to which its position and inclination are inappropriate is converted to an index number. In the following explanation, of all the elements PS of the photometric device 4, the rows of elements that share the same y coordinates are referred to as the rows x, and the row x that is ith row from the left end in the direction of the x axis is expressed as the row xi.

As shown in FIG. 17A, in the calculation of the horizontal edge poor composition index number G3, first in step S271, the rows x1 and xm are scanned and the distribution of the photometric values in those rows are detected. The row x1 is the row of elements at the left end in the horizontal direction in the photographic field and the row xm is the row of elements at the right end. In step S272 that follows, a decision is made as to whether or not the elements with the same photometric value Bv are present continuously for the number of elements T or more for the row x1 and for the row xm. If the requirement in step S272 is met for both the rows x1 and xm, then the operation proceeds to step S273 in which the photometric value Bv and the positions of elements that satisfies the affirmation requirement are stored in memory. If the requirement of step S272 is not met for both the rows x1 and xm, the operation proceeds to step S284 (FIG. 17C).

In step S274, a decision is made as to whether or not the two different photometric values Bv1, Bv2 that are common to the row x1 and the row xm have been stored in memory in step S273. If they have been stored in memory, the operation proceeds to step S275 (FIG. 17B). Otherwise, the operation proceeds to step S284. In step S275, a decision is made as to whether or not the elements with the photometric value Bv1 and the elements with the photometric value Bv2 are contiguous in the row x1 and the row xm. If they are contiguous, the operation proceeds to step S276, otherwise the operation proceeds to step S284. In step S276, the y coordinates of the contact point of the elements with the photometric value Bv1 and the elements with the photometric value Bv2 in the row x1 is defined as Ya, Yb and the y coordinates of the contact point of elements with the photometric value Bv1 and the elements with photometric value Bv2 in the row xm is defined as Yc, Yd. In step S277 that follows, the judgement values J1 and Jm for identifying the vertical relationship between the elements with the photometric value Bv1 and the elements with the photometric value Bv2 in the rows x1 and xm are calculated using the following formulas:

$$J1 = Ya - Yb$$

$$Jm = Yc - Yd$$

In step S278 that follows, a decision is made as to whether or not the plus/minus signs of the judgement values J1 and Jm match each other. If they match, the operation proceeds to step S279 and if not, the operation proceeds to step S284. In step S279, the smaller value of Ya or Yb is defined as the boundary coordinate Yx1 in the row x1 and the smaller value of Yc or Yd is defined as the boundary coordinate Yxm in the row xm. In step S280 (FIG. 17C) that follows, the amount of deviation ΔY of the edges at the left and right ends of the photographic field is calculated using the following formula and a decision as to whether or not the value is equal to or less than the allowable value H0 is made.

$$\Delta Y = |Yx1 - Yxm|$$

If the amount of deviation ΔY is equal to or less than the allowable value H0, the operation proceeds to step S281 and a decision is made as to whether or not the boundary coordinate Yx1 (may be substituted with Yxm) is in an non-allowable range according to the relationship below.

$$P \cdot n \leq Yx1 \leq Q \cdot n$$

The coefficients P, Q are used for determining whether or not the horizontal edge X3 crosses the central portion of the photographic field and the preferable settings will be approximately 0.4 for P and 0.6 for Q.

If the requirement in step S281 is satisfied, the operation proceeds to step S282 to set the index number G3 at the maximum value. If a negative decision is made in step S280, the operation proceeds to step S283 and the index number G3 is set in correspondence to the amount of deviation ΔY. Here, the greater the amount of deviation ΔY, the greater the index number G3 becomes. The degree to which it increases may be in proportion to the amount of deviation ΔY or it may be made to increase as an increasing function (quadratic or more) against the amount of deviation ΔY. If a negative decision is made in step S281, the operation proceeds to step S284 in which the index number G3 is set to 0. When the processing in steps S282, S283, S284 is finished, the operation returns to the processing shown in FIG. 10.

Figure 19A:
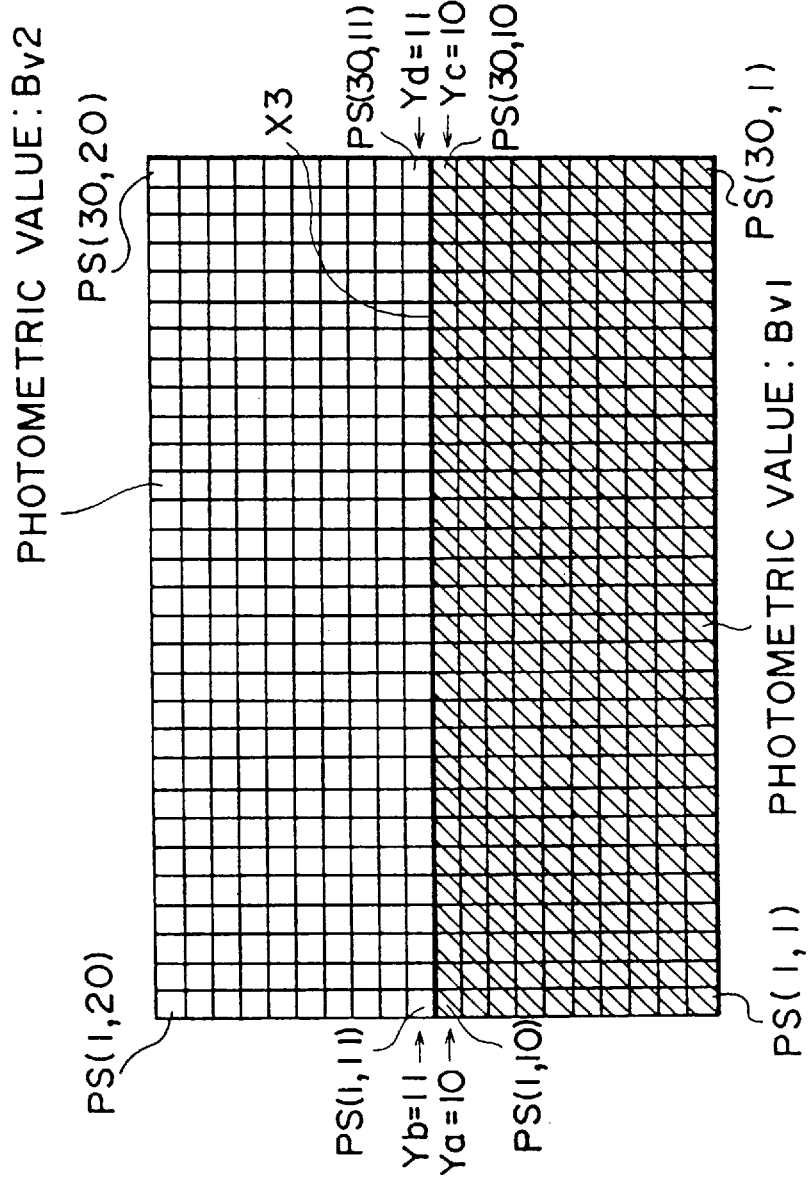
FIGS. 19A and 19B show the correspondence between the edge shown in FIG. 18 and the arrangement of the elements shown in FIG. 13.
Figure 19B:
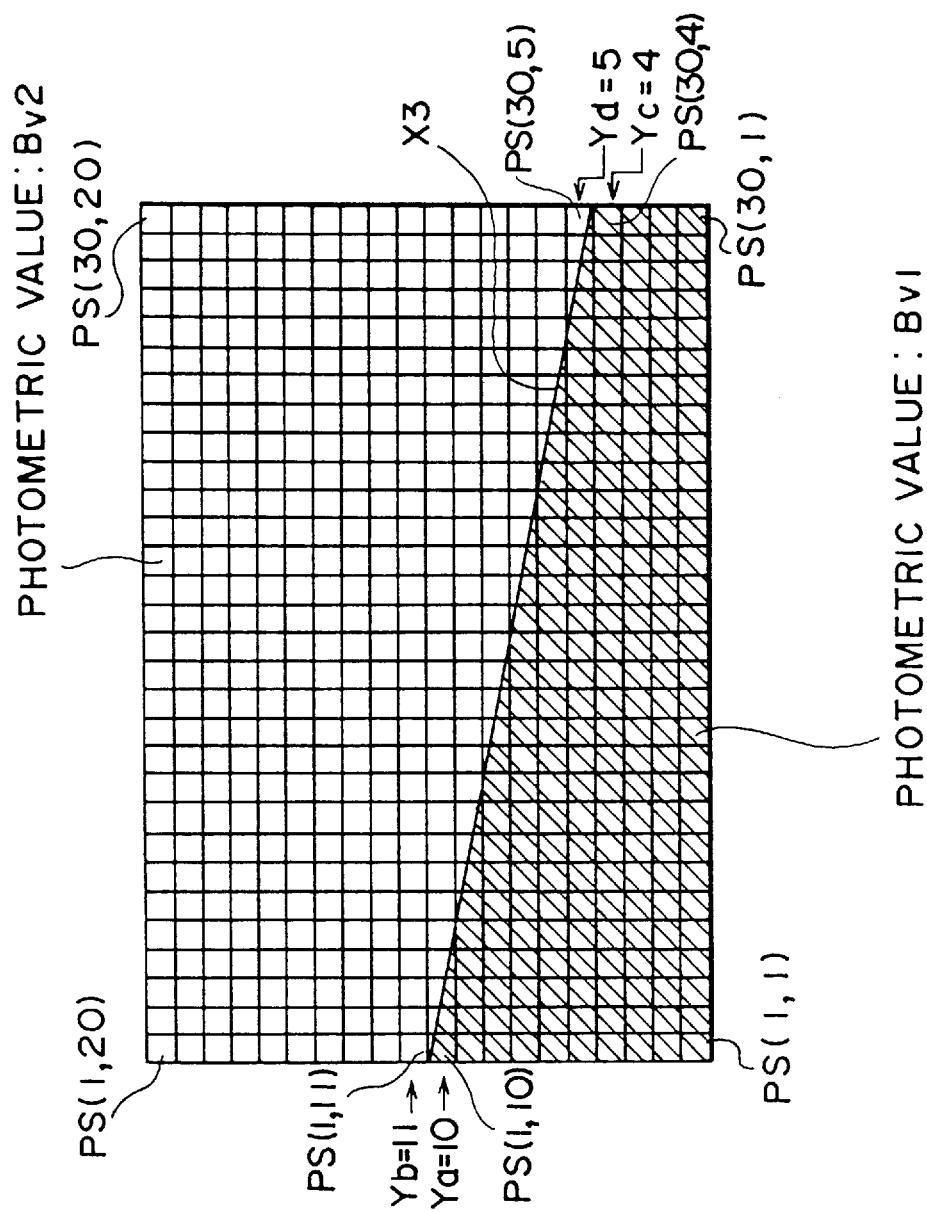

An actual example of the processing shown in FIGS. 17A~17C is explained in reference to FIG. 19. FIG. 19A shows a composition in which the horizontal edge X3 crosses the center of the photographic field and FIG. 19B shows a composition in which the horizontal edge X3 tilts and both show the correspondence to the arrangement of the elements PS of the photometric device 4. The arrangement of the elements PS is as shown in FIG. 13 and the specific number of elements T is 4 in step S272. For the sake of simplification, we assume that the photometric values are consistent in areas over and under the horizontal edge X3, respectively. In an actual photographic image plain, various photometric values are detected but when there is a horizontal line present in the photographic image plain, there is a distinct difference in the photometric values between areas over and under it. Therefore, when performing the processing shown in FIGS. 17A~17C, by setting an appropriate allowable range for deciding whether or not the photometric values are the same photometric value Bv or by converting the photometric values on the photometric device 4 into binary values with an appropriate threshold value, we can regard the photographic field to be as shown in FIG. 19A and 19B.

When the processing shown in FIGS. 17A~17C is applied to the photographic field shown in FIG. 19A, in the processing in steps S271~S273, the elements PS (1, 1)~PS (1, 10) are stored in memory as the group with the same photometric value Bv1 and the elements PS (1, 11)~PS (1, 20) are stored in memory as the group with the same photometric value Bv2, for the row x1. The elements PS (30, 1)~PS (30, 10) are stored in memory as the group with the same photometric value Bv1 and the elements PS (30, 11)~PS (30, 20) are stored in memory as the group with the same photometric value Bv2 for the row x30. In this manner, the two different photometric values Bv1, Bv2 which are common to the rows x1 and x30 are stored in memory and since the elements with the photometric value Bv1 and the elements with the photometric value Bv2 are contiguous in the rows x1 and x30, affirmative decisions are made in steps S274 and S275. Because of this, in step S276, the y coordinates "10" and "11" of the elements PS (1, 10) and PS (1, 11) in the row x1 are defined as Ya and Yb respectively and the y coordinates "10" and "11" of the elements PS(30, 10) and PS (30, 11) in the row x30 are defined as Yc and Yd respectively. As a result, in step S277, J1=J30=−1, and both J1 and J30 are negative values, then an affirmative decision is made in step S278, and in step S279, Yx1=Ya=10 and Yxm=Yc=10.

For Yx1 and Yxm above, in step S280, ΔY=0 and this value is equal to or smaller the allowable value H0, then an affirmative decision is made. If P=0.4 and Q=0.6 in step S281, then P·n=8 and Q·n=12 because n=20, and since Yx1=10, it is determined that the horizontal edge crosses the central portion of the photographic field. Then in step S282, the index number G3 is set to the maximum value.

For the photographic field shown in FIG. 19B, in the processing performed in steps S271~S273, the elements PS (1, 1)~PS (1, 10) are stored in memory as the group with the same photometric value Bv1 and the elements PS (1, 11)~PS (1, 20) are stored in memory as the group with the same photometric value Bv2, for the row x1. The elements PS (30, 1)~PS (30, 4) are stored in memory as the group with the same photometric value Bv1 and the elements PS (30, 5)~PS (30, 20) are stored in memory as the group with the same photometric value Bv2 for the row x30. In this case too, there are two different photometric values Bv1 and Bv2 which are common to the rows x1 and x30 and since the groups of elements with photometric values Bv1, Bv2 are contiguous in the rows x1 and x30, affirmative decisions are made in steps S274, S275. Then, in step S276, the y coordinates "10" and "11" of the elements PS (1, 10) and PS (1, 11) are defined as Ya and Yb in the row x1 and the y coordinates "4" and "5" of the elements PS(30, 4) and PS (30, 5) in the row x30 are defined as Yc and Yd respectively. As a result, J1=J30=−1 and since both J1 and J30 are negative values, an affirmative decision is made in step S278, then in step S279, Yx1=Ya=10 and Yxm=Yc=4. For Yx1 and Yxm above, in step S280, ΔY=6 and if the allowable value H0=3, then a negative decision is made. As a result, in step S283, the index number G3 that corresponds to the amount of deviation ΔY is set.

As is evident from the description above, with the processing shown in FIGS. 17A~17C, a decision is made in steps S271~S275 as to whether or not an edge that divides the rows into upper and lower portions is present in the row x1 and the row xm which are at both ends in the horizontal direction of the photographic field, and if such an edges is present, a decision is made as to whether or not the edge in the row x1 and the edge in the row xm may be regarded as the same horizontal edge X3, based upon the vertical relationship between the photometric values in the rows x1 and xm in steps S276~S278. If they are determined to be the same horizontal edge X3, the y coordinates at both ends thereof are defined as Yx1 and Yxm in step S279. Then the inclination of the horizontal edge X3 is calculated as the amount of deviation ΔY of the y coordinates Yx1 and Yxm and if the amount of deviation ΔY exceeds the allowable value H0, then the greater the deviation, the greater a value is set for the index number G3. Even when the inclination of the horizontal edge X3 is within the allowable range, if it crosses the central portion of the photographic field, the index number G3 is set to the maximum value in steps S281 and S282. Therefore, the index number G3 effectively indicates the degree of influence that the position and inclination of the horizontal edge X3 will have on the judgement of poor composition.

As has been explained so far, according to this embodiment, the poor composition index number G becomes greater as the degree to which the inclination of a columnar object, the position of the main photographic subject and the position and inclination of a horizontal edge fit with the requirements of poor composition becomes high, and the likelihood of a warning being issued in step S25 as a result of the poor composition index number G reaching or exceeding the reference values p, q in step S26 or step S27 shown in FIG. 9, increases. Since the inherent requirements for poor composition are set separately for each type of edges present in the photographic field, and the index numbers G1~G3 are calculated for individual edges in reference to those requirements, poor composition can be estimated in a more diverse and accurate manner compared to the prior art.

In this embodiment, the likelihood of a composition being determined to be a good composition increases when the photographic magnification β is equal to or greater than the judgement photographing magnification a, since the reference values have the relationship in which p>q. This is because the influence of the edges in the background on the estimation of good or poor composition is reduced when the photographing magnification β increases, making the area occupied by the main photographic subject greater. The reason why the calculation of the dispersion index number E is omitted when β≧a is that when the photographing magnification β increases, the necessity for observing the periphery of the photographic field decreases, therefore, the time required for calculation of the dispersion index number E is saved, preventing dead time. However, the dispersion index number E may be calculated even when β≧a and a warning may be issued according to the level of the index number E. When β<a, the route with which the dispersion index number E is calculated, as described in the first embodiment, may be divided into two or more in correspondence to the photographing magnification β. It is also possible to omit the calculation of the dispersion index number E altogether even when β<a. By changing the requirements for poor composition (for example, the allowable range for the inclination of the horizontal edge X3), according to the photographing mode, accurate estimation of whether or not the composition is good in each photographing mode is possible. The relationship among the index numbers G1~G3 and the reference values p, q should be established by setting the reference values p, q to smaller values than the maximum values of the index numbers G1~G3 or by setting the reference values p, q to greater values than the maximum values of the index numbers G1~G3.

The calculations of the aforementioned index numbers G1~G3 may be executed by selecting one or two of them. For example, when the photographing magnification β is great, the likelihood of the portrait photographing is high and the necessity of paying much attention to the background, decreases, while when the photographing magnification β is low, the influence of the background is great, therefore if an affirmative decision is made in step S11 in FIG. 9, then only the main photographic subject poor composition index number G2 need be calculated, and if a negative decision is made in step S11, only the horizontal edge poor composition index number G3 need be calculated. It is also possible to use different calculation procedures depending upon the photographing mode. For example, the main photographic subject poor composition index number G2 may be calculated when the photographing mode is set to portrait mode, the horizontal edge poor composition index number G3 may be calculated when the photographing mode is set to the landscape mode and the columnar object poor composition index number G1 may be calculated in the commemoration photo mode.

Third Embodiment

The third embodiment of the present invention is explained in reference to FIGS. 20~24. Identical components to those used in the first embodiment and second embodiment described above are assigned with the same key numbers and their explanation is omitted.

Figure 20:
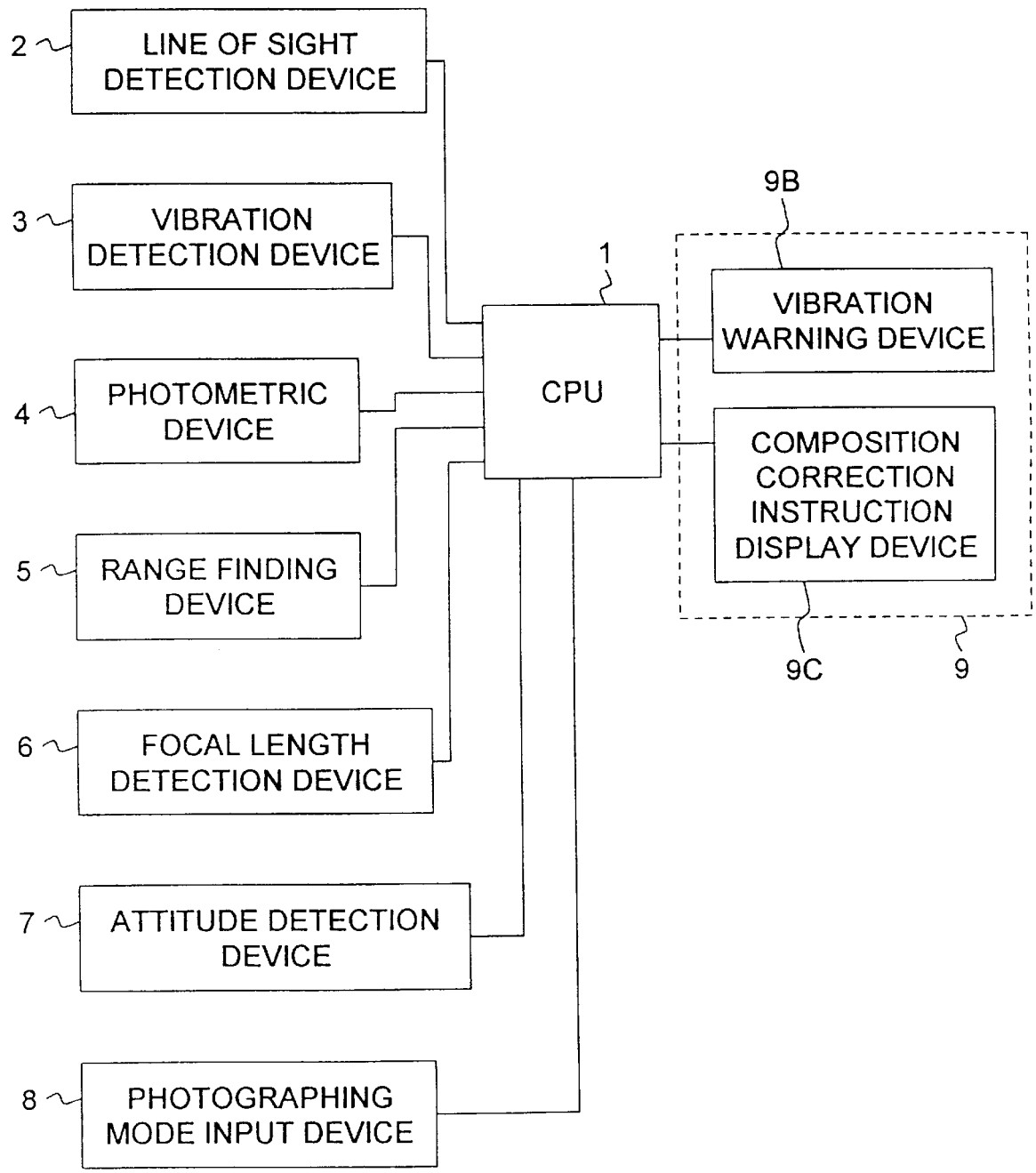
FIG. 20 is a block diagram of the control system in the third embodiment according to the present invention.

As shown in FIG. 20, in this embodiment, an indicator device 9 is provided with a vibration warning device 9B and a composition correction instruction indicator device 9C. The CPU 1 executes a correction direction detection processing to be explained later prior to photographing, in which it detects the correction direction required for the composition based upon the distribution of photometric values detected by the photometric device 4. The results are displayed on the composition correction instruction indicator device 9C.

Figure 21:
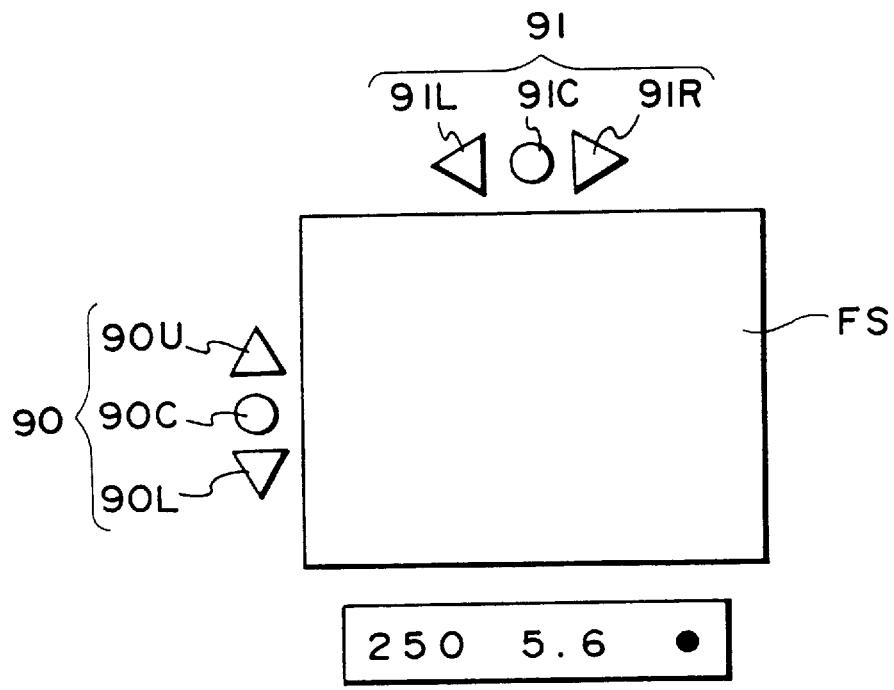
FIG. 21 shows an example of the indication within the view finder by the indicator device 9 in FIG. 20.

The vibration warning device 9B and the composition correction instruction indicator device 9C are shown in FIG. 21. The device shown in FIG. 21 is provided with indicators 90, 91 on the left side and on the upper side of the view finder field FS of the camera. The indicator 90 is provided with triangular direction indicator lamps 90U, 90L and a circular central lamp 90C positioned between the two direction indicator lamps. When the camera is to be moved in the direction of the short side of the photographic field (vertical direction in the figure) to correct the composition, either the direction indicator lamp 90U or the direction indicator lamp 90L, which ever corresponds to the direction for correction, is lit. If it is not necessary to move the camera in the direction of the short side, the central lamp 90C comes on. The indicator 91 is provided with triangular direction indicator lamps 91R, 91L and a circular central lamp 91C positioned between the two direction indicator lamps. When the camera is to be moved in the direction of the long side of the photographic field (horizontal direction in the figure) to correct the composition, either the direction indicator lamp 91R or the direction indicator lamp 91L, which ever corresponds to the direction for correction, is lit. When it is not necessary to move the camera in the direction of the long side of the photographic field, the central lamp 91C comes on. When a vibration warning is issued, all the lamps of the indicators 90, 91, blink. All the lamps on the indicators 90, 91 remain lit to prompt verification of the composition.

Figure 22:
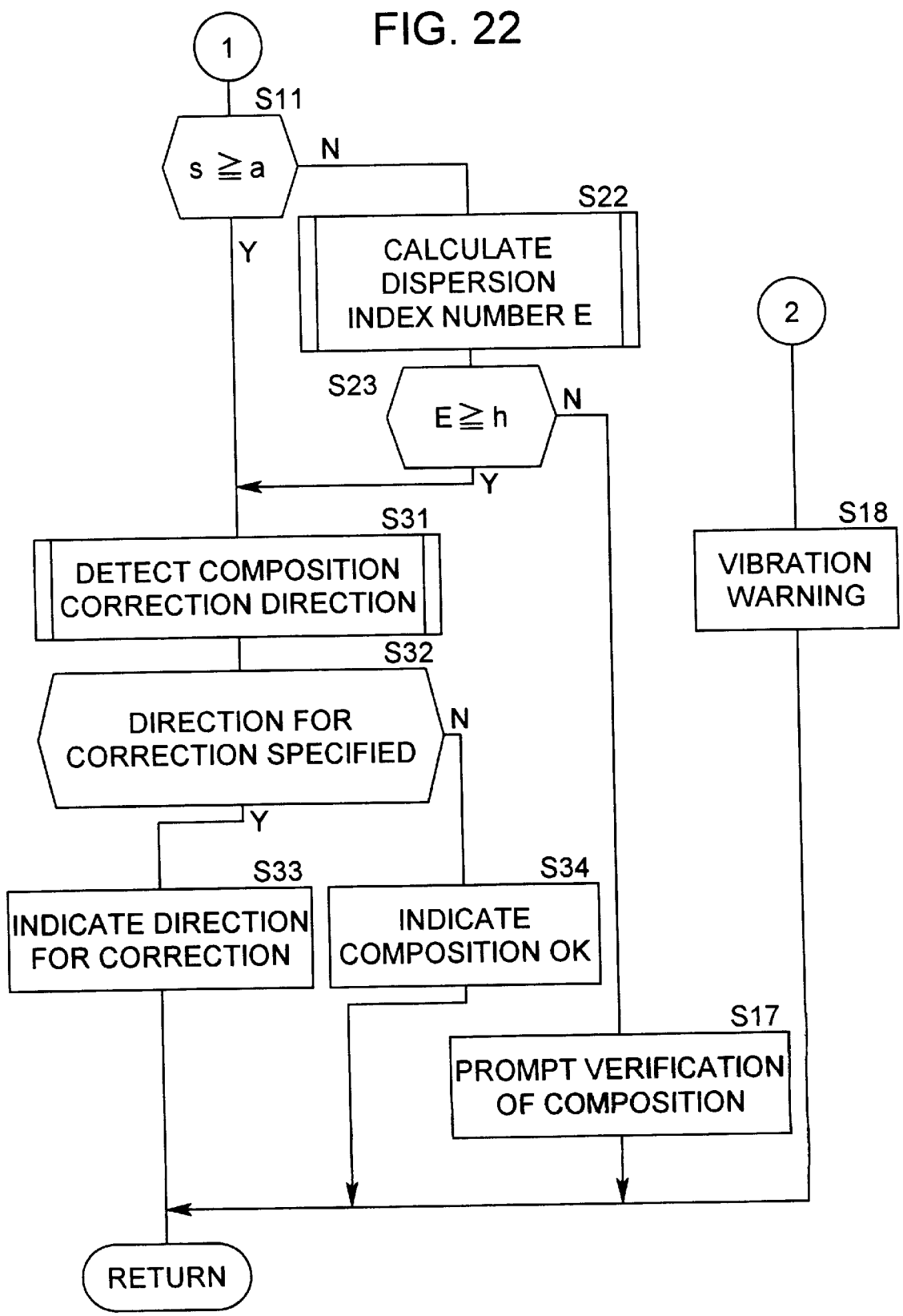
FIG. 22 is a flow chart showing the characteristic portions of the composition estimation procedure in the third embodiment according to the present invention.

FIG. 22 shows part of the composition estimation procedure performed by the CPU 1 in this embodiment. Steps S11, S22 and S23 in the figure are the same as the corresponding steps in FIG. 9 and steps S17 and S18 are the same as the corresponding steps in FIG. 7 so their explanation is omitted. Prior to step S11, the processing in steps S1~S10 shown in FIG. 4A is performed.

In this embodiment, when the photographing magnification β is determined to be equal to or greater than the judgement photographing magnification a in step S11, and when the dispersion index number E is determined to be equal to or greater than the reference value h in step S23, the operation proceeds to step S31 to perform the correction direction detection processing for the composition. The details of this processing are to be explained later. In step S32, a decision is made as to whether or not the direction for correction for the composition has been specified in step S32. If the correction direction has been specified, the operation proceeds to step S33 to indicate the direction of that correction on the indicator 90 or the indicator 91. If it is decided in step S32 that there is no direction for correction, the operation proceeds to step S34 in which the good composition indication is performed.

Figure 23:
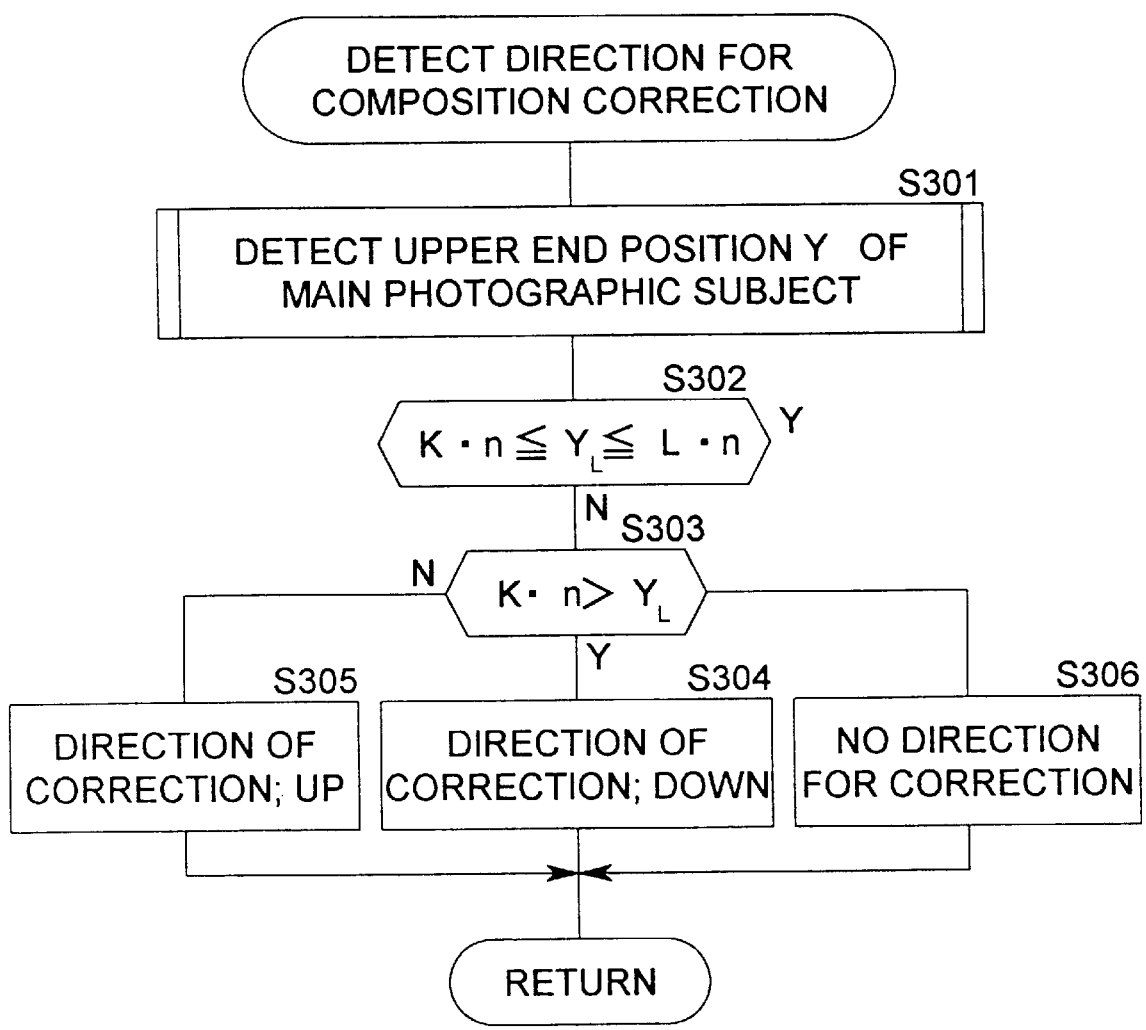
FIG. 23 is a flow chart showing an example of the composition correction direction detection processing in FIG. 22.

FIG. 23 shows the details of the composition correction direction detection processing. In this processing, the direction for correction required for maintaining the correct distance between the upper end of the main photographic subject and the upper end of the photographic field is detected. In the following explanation, the expressions used in relation to the x axis direction and y axis direction of the photographic field and the arrangements of the elements on the photometric device 4, are common to those used in the second embodiment.

In the processing shown in the figure, first, in step S301, the y coordinate YL at the upper end of the main photographic subject within the photographic field is determined, based upon the distribution of photometric values detected by the photometric device 4. This processing is identical to that performed in steps S241 through S250 shown in FIGS. 15A and 15B. In other words, in step S301 it determines the boundary coordinate YL as in step S250 in FIG. 15B. After the coordinate YL is determined, the operation proceeds to step S302, in which a decision is made as to whether or not the coordinate YL is within the allowable range, as in step S251 in FIG. 15B. If the coordinate YL is not within the allowable range, the operation proceeds to step S303 to determine whether or not the coordinate YL is less than the lower limit (K·n) of the allowable range. If it is less than the lower limit (K·n), the operation proceeds to step S304 to set the correction direction to "down". On the other hand, if the coordinate YL is not less than the lower limit (K·n ), the operation proceeds to step S305 to set the correction direction to "up". If the coordinate YL is determined to be within the allowable range in step S302, the operation proceeds to step S306 to set the correction direction to "no correction direction". When the processing in steps S304~S306 is completed, the operation returns to the processing shown in FIG. 22. If negative decisions are made for the requirements that correspond to those in steps S248, S249 in FIG. 15B during the detection processing for the coordinate YL in step S301, the operation proceeds to step S306.

Figure 24A:
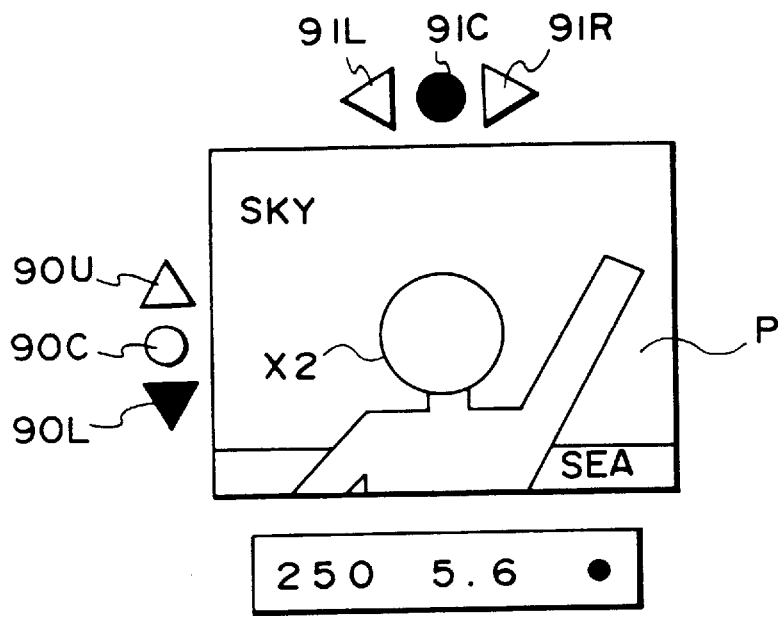
FIGS. 24A and 24B show examples of the indication of the composition correction direction when the processing in FIG. 23 is executed.
Figure 24B:
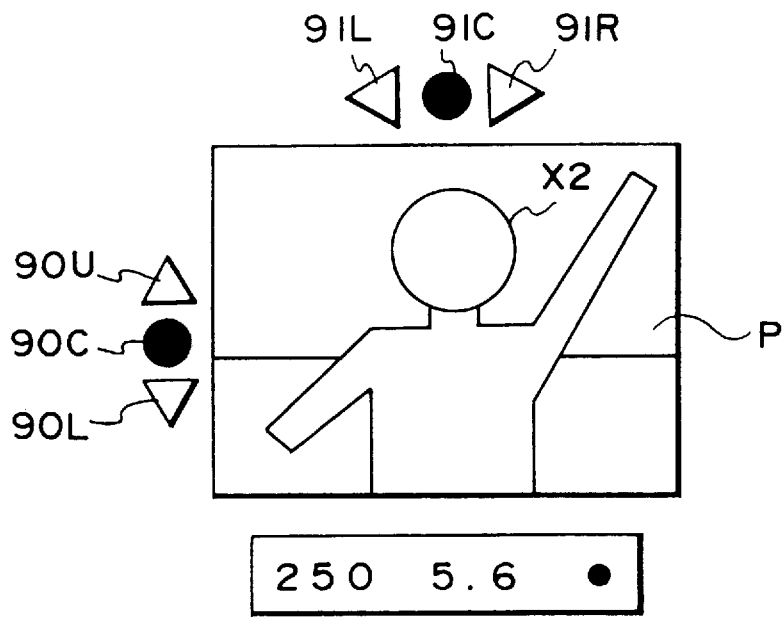

In the processing described above, the correction direction "down" is displayed on the indicator 90 or 91 if the position of the upper end of the main photographic subject is out of the allowable range downwards, and on the contrary thereto if it is out of range upwards, the correction direction "up" is displayed on the indicator 90 or 91. For example, in the composition shown in FIG. 24A, since the main photographic subject X2 is positioned toward the bottom of the photographic field P, the direction for correction is determined to be "down" and the indicator lamp 90L on the indicator 90 comes on. On the indicator 91, the central lamp 91C comes on. When the camera is moved downwards, by following the instruction on the indicator 90, the main photographic subject X2 makes relative upward movement in the photographic field. As shown in FIG. 24B, if the detection of composition correction direction is repeated in the state in which the main photographic subject X2 is within the allowable range, the composition is determined have no correction direction and the central lamp 90C on the indicator 90 is lit.

If the direction for correction of the composition is instructed as in this embodiment, even when the photographer does not know typical examples of poor composition, he can photograph a picture in which the composition is good by merely following the display instructions in the camera. Which of the indicators 90 or 91 is used is determined by the attitude of the camera. In other words, when the camera is held in the lateral position, the indicator 90 is used to instruct the correction in the vertical direction and when the camera is held in the longitudinal position, the indicator 91 is used to instruct the correction in the vertical direction.

Although in the example described above, only the direction for correction related to the position of the main photographic subject is detected, the direction for correction for the columnar object X1 shown in FIG. 12B and the inclination of the horizontal edge X3 shown in FIG. 19B can be detected by applying the calculation of the index numbers G1 and G3 in the second embodiment. These examples are explained in reference to FIGS. 25 and 26.

Figure 25:
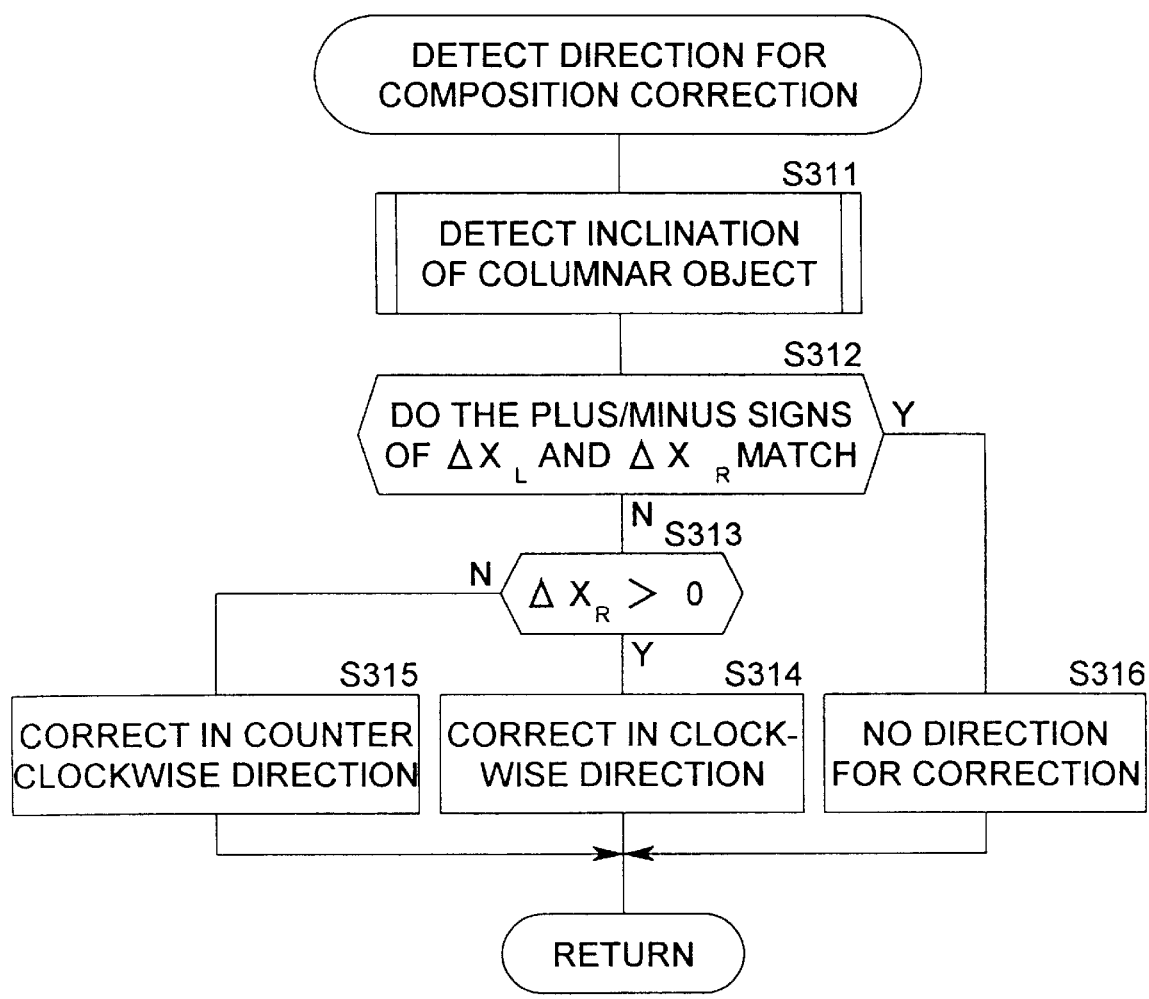
FIG. 25 is a flow chart showing the other example of the composition correction direction detection processing in FIG. 23.

FIG. 25 shows the correction direction detection procedure for a columnar object. In this example, first, in step S311, the inclination of the columnar object within the photographic field is detected, based upon the distribution of photometric values detected by the photometric device 4. This processing is identical to that in steps S211 through S223 in the calculation procedure for the columnar object poor composition index number G1 shown in FIGS. 11A through 11C. In other words, in step S311, the amounts of deviation $\Delta X_L$, $\Delta X_R$ are calculated as in step S223 in FIG. 11C.

When the amounts of deviation $\Delta X_L$ and $\Delta X_R$ are calculated, a decision is made as to whether or not the plus/minus signs of the two quantities match in step S312 that follows. This decision must be made since, if they do not match, it means that the directions of inclination of the columnar object are different on the left and right sides and consequently, the direction for correction cannot be specified. If in step S312 it is determined that the plus/minus signs match, the operation proceeds to step S313 to determine whether or not the plus/minus sign of the amount of deviation $\Delta X_R$ (may be substituted by $\Delta X_L$) is a positive value. If it is a positive value, then the operation proceeds to step S314 to set the direction for correction to the clockwise direction. If the amount of deviation $\Delta X_R$ is a negative value, the direction for correction is set to the counter clockwise direction. If it is determined in step S312 that the plus/minus signs do not match, the operation proceeds to step S316 to decide that there is "no correction direction". The operation also proceeds to step S316 if a negative decision is made in step S311 for the requirement that corresponds to those in steps S218, S219 in FIG. 11B.

As is clearly shown in FIG. 14, when the columnar object X1 inclines to the left of the photographic field, the amount of deviation $\Delta X_R$ is a negative value because Xc<Xa, and in the reverse case, in which the columnar object X1 inclines to the right of the photographic field, the amount of deviation $\Delta X_R$ is a positive value because Xc>Xa. When the columnar object X1 is inclined to the left, the inclination is reduced by turning the camera in the counter clockwise direction, with the center of the photographic field as the axis, and if the inclination is in the opposite direction, the camera must be turned in the clockwise direction. Since, in the processing shown in FIG. 25, the direction for correction is determined to be counter clockwise when the amount of deviation $\Delta X_R$ is a negative value, and to be the clockwise direction when it is a positive value in step S313, the photographer can be accurately instructed as to the direction for correction of the inclination of the columnar object X1.

Figure 26:
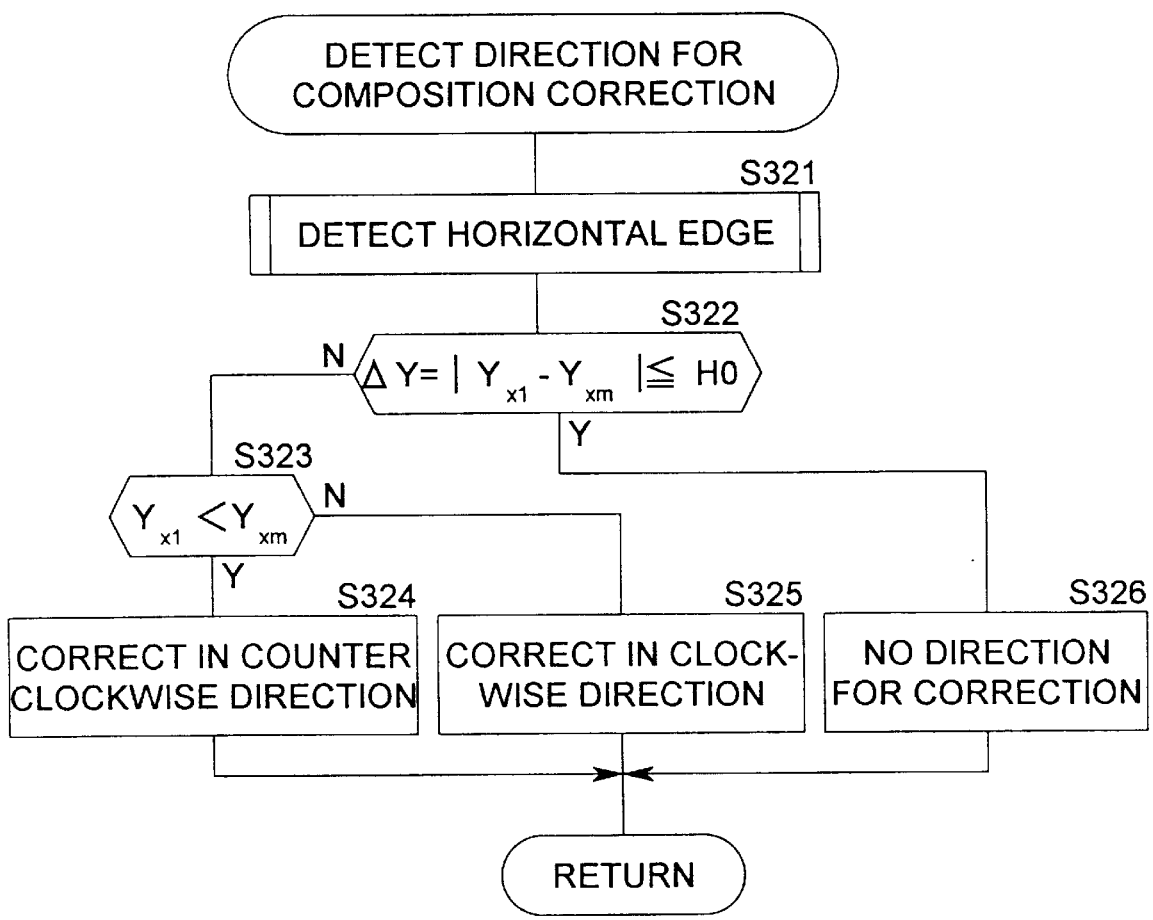
FIG. 26 is a flow chart showing yet the other example of the composition correction direction detection processing in FIG. 23.

FIG. 26 shows the correction direction detection procedure for a horizontal edge. In this example, first, in step S321, the position of the horizontal edge within the photographic field is detected, based upon the distribution of photometric values detected by the photometric device 4. This processing is identical to that in steps S271 through S279 in the calculation procedure for the horizontal edge poor composition index number G3 shown in FIGS. 17A–17C. In other words, in step S321, the y coordinates Yx1 and Yxm of the horizontal edge X3 at the left and right ends are calculated as in step S279 shown in FIG. 17B.

In step S322 that follows, a decision is made as to whether or not the amount of deviation $\Delta Y$ that corresponds to the inclination of the horizontal edge X3 is equal to or less than the allowable value H0, as in step S280 in FIG. 17C. If it is determined that it exceeds the allowable value H0, the operation proceeds to step S323 in which a decision is made as to whether or not the Y coordinate Yx1 at the left end of the horizontal edge X3 is smaller than the Y coordinate Yxm at the right end. If it is smaller, the operation proceeds to step S324 to set the direction for correction to the counter clockwise direction. Unless the coordinate Yx1 is smaller than the coordinate Yxm, the operation proceeds to step S325 to set the direction for correction to the clockwise direction. If in step S322 it is determined that the inclination is equal to or less than the allowable value H0, the operation proceeds to step S326 to decide that there is no direction for correction. The operation also proceeds to step S326 if negative decision is made for any one of the requirements that correspond to those in steps S272, S274, S275 and S278 in FIGS. 17A and 17B.

When the horizontal edge X3 is inclined downward to the right, as shown in FIG. 19B, a negative decision is made in step S323 because Yx1>Yxm and the composition correction direction is set to the clockwise direction in step S325. On the other hand, if the horizontal edge X3 is inclined downward to the left, an affirmative decision is made in step S323 because Yx1<Yxm and the composition correction direction is set to the counter clockwise direction in step S324. When the horizontal edge X3 is inclined downward to the right, the inclination can be reduced by turning the camera clockwise with the center of the photographic field as the axis, and if the inclination is in the opposite direction, then the camera should be turned in the counter clockwise direction. Therefore, with the processing shown in FIG. 26, the photographer is accurately instructed as to the direction for correction of the inclination of the horizontal edge X3. Alternatively, the processing in step S281, as shown in FIG. 20, may be executed when an affirmative decision is made in step S322 and a separate warning may be issued when the horizontal edge X3 crosses the center of the photographic field.

The aforementioned processing shown in FIGS. 25 and 26 may replace the processing shown in FIG. 23 or may be implemented in addition to the processing shown in FIG. 23. However, when a plurality of processings are performed, the directions for correction detected in the various processings may be mutually conflicting, as, for example, when the direction for correction that corresponds to the columnar object X1 is the clockwise direction and the direction for correction that corresponds to the horizontal edge X3 is counter clockwise. In such an event, it is necessary to implement support operating such as a decision that there is no direction for correction. In order to instruct the direction of rotation as the direction for correction, it is advisable to use the indicators 92, 93 shown in FIG. 27.

Figure 27:
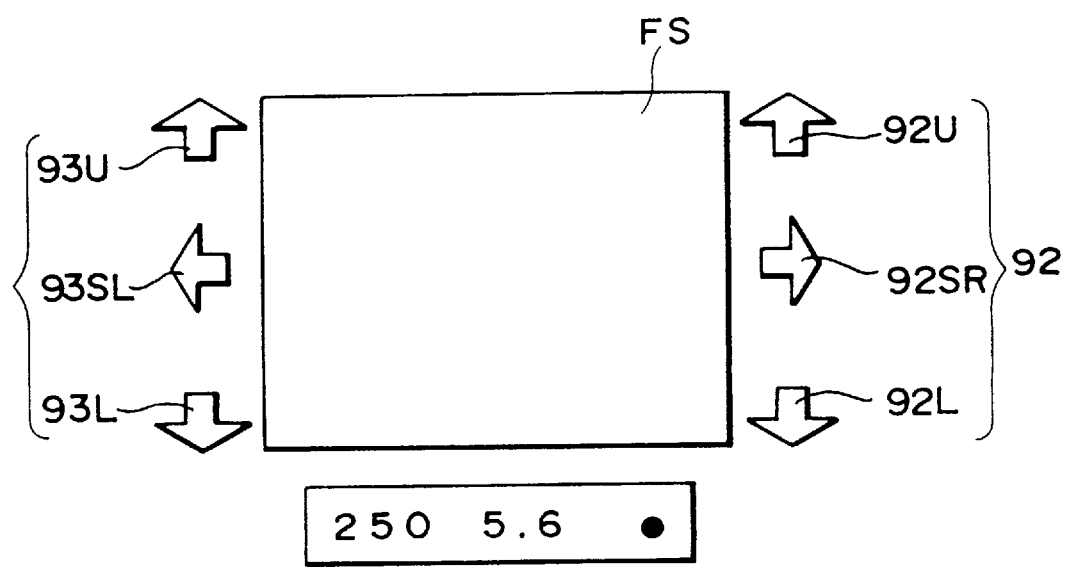
FIG. 27 shows an example of a variation in FIG. 21.

In the example shown in FIG. 27, a pair of indicators 92, 93 are provided on the left and right of the view finder field FS of the camera, respectively. The indicators 92, 93 are provided with the arrow-shaped direction indicator lamps 92U, 93U that point upward in the direction of the short side of the photographic field, the arrow-shaped direction indicator lamps 92L, 93L that point downwards and the direction indicator lamps 92SR, 93SL that point outwards in the direction of the long side of the photographic field. A means for light emitting in the known art of the kind used in the display within the view finder such as an LED may be used for these indicator lamps.

With the indicators 92, 93 described above, an upward correction can be indicated by lighting the direction indicator lamps 92U, 93U, and a downward correction can be indicated by lighting the direction indicator lamps 92L, 93L. Correction to the right side can be indicated by lighting the direction indicator lamp 92SR and correction to the left side can be indicated by lighting the direction indicator lamp 92SL. Also, by lighting the direction indicator lamps 92U and 93L at the same time, correction in the counter clockwise direction can be indicated and by lighting the direction indicator lamps 92L and 93U at the same time, correction in the clockwise direction can be indicated.

Figure 28A:
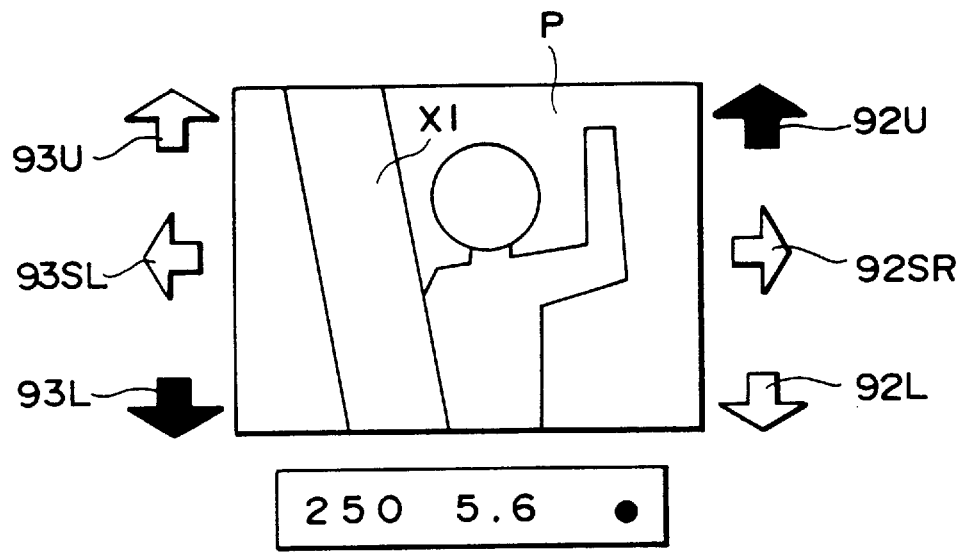
FIGS. 28A and 28B show examples of the indication of the composition correction direction when the processing in FIG. 25 is executed.
Figure 28B:
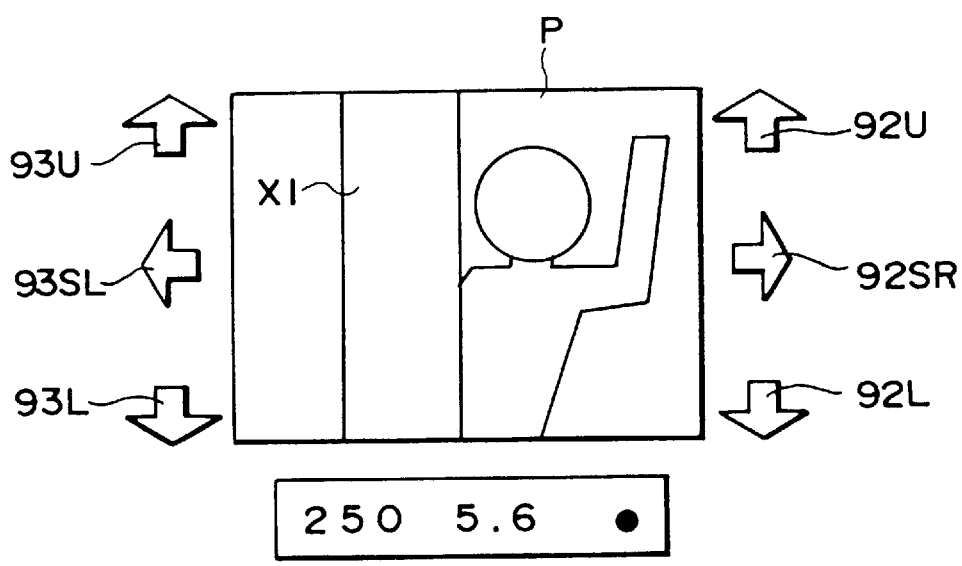
Figure 29A:
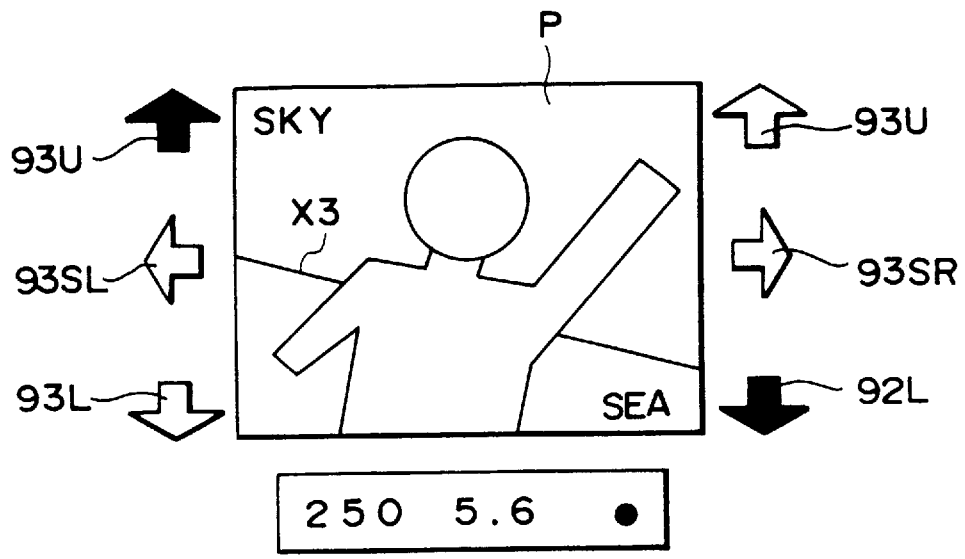
FIGS. 29A and 29B show an example of the indication of the composition correction direction when the processing in FIG. 26 is executed.
Figure 29B:
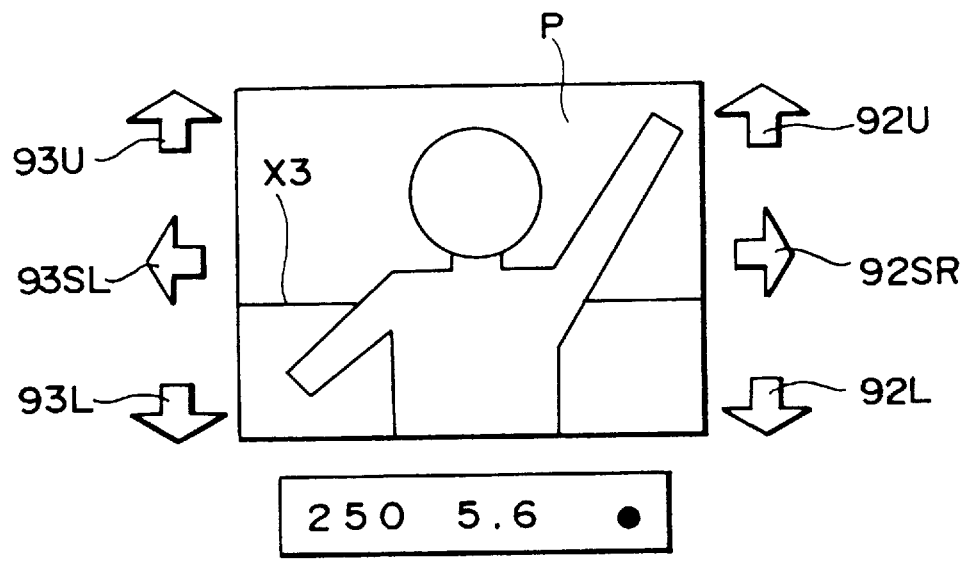

For example, in the composition shown in FIG. 28A, the direction indicator lamps 92U and 93L are lit at the same time as the columnar object X1 is inclined to the left of the photographic field P. If the camera is turned in the counter clockwise direction by following these indications, the inclination of the columnar object X1 is corrected as shown in FIG. 28B. In the composition shown in FIG. 29A, the direction indicator lamps 93U and 92L are lit at the same time as the horizontal edge X3 is inclined downward to the right within the photographic image plane P. If the camera is turned in the clockwise direction by following these indications, the inclination of the horizontal edge X3 is corrected as shown in FIG. 29B.

When it is not necessary to correct the composition, all the indicator lamps are off. In order to issue a vibration warning, all the indicator lamps are blinked. A verification of the composition may be prompted based upon the dispersion index number E by lighting all the lamps.

Fourth Embodiment

Figure 30:
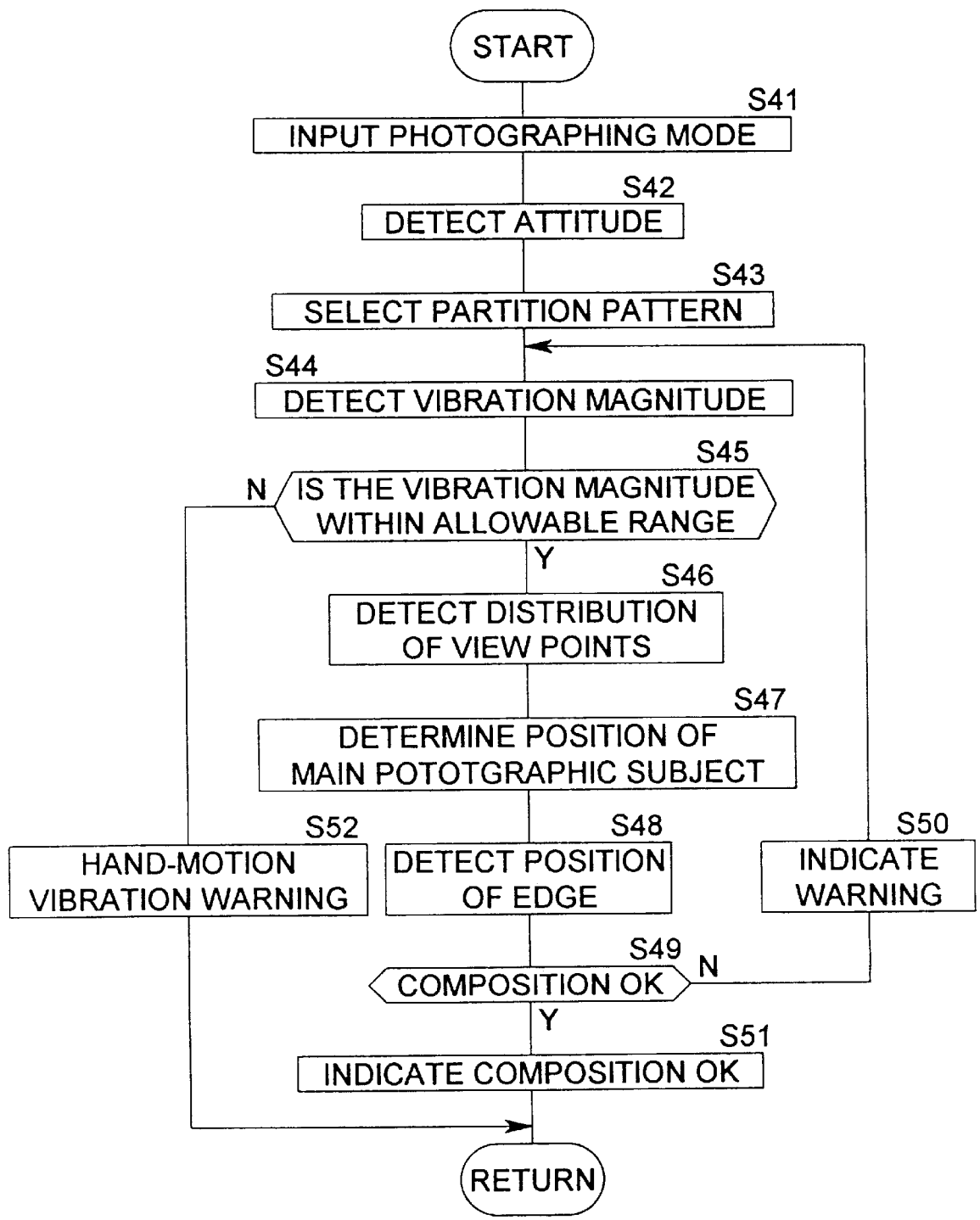
FIG. 30 is a flow chart showing the composition estimation procedure in the fourth embodiment according to the present invention.

The fourth embodiment of the present invention is explained in reference to FIGS. 30 and 31. In this embodiment, the composition estimation processing that is different from those performed in the other embodiments described above is performed by the CPU1. Therefore, the characteristic portions of the composition estimation processing are mainly explained below.

FIG. 30 shows the procedure for composition estimation processing performed in this embodiment. In comparison between the processing shown in FIG. 30 and that performed in the first embodiment, as shown in FIGS. 4A and 4B, we see that step S41 corresponds to step S1, step S42 corresponds to step S3, step S43 corresponds to step S4, step S44 corresponds to step S6 and Step S45 corresponds to step S7. If, in step S45 it is determined that the magnitude of vibration is not within the allowable range, the operation proceeds to step S52 to issue a warning against vibration caused by hand movement.

If it is determined in step S45 that the magnitude of vibration is within the allowable range, the operation proceeds to step S46 in which the distribution of view points of the photographer is detected based upon the lines of sight detected by the line of sight detection device 2. This processing corresponds to the processing performed in steps S101~S108 in FIG. 5. In other words, in this processing, the view point present time t (i, j), for each area W shown in FIG. 3C is detected. When the distribution of the view points is detected, the operation proceeds to step S47 in which the area W (i, j), for which the view points present time t (i, j) is the longest, is specified as the position of the main photographic subject. For example, when taking a picture with a person as the main photographic subject, since the view points are concentrated on the face of the person, the position of the main photographic subject can be specified very accurately with the processing described above. Even when the photographic subject is not a person, the view points will be concentrated thereon in the same manner and the processing described above can be used without modification.

Figure 31A:
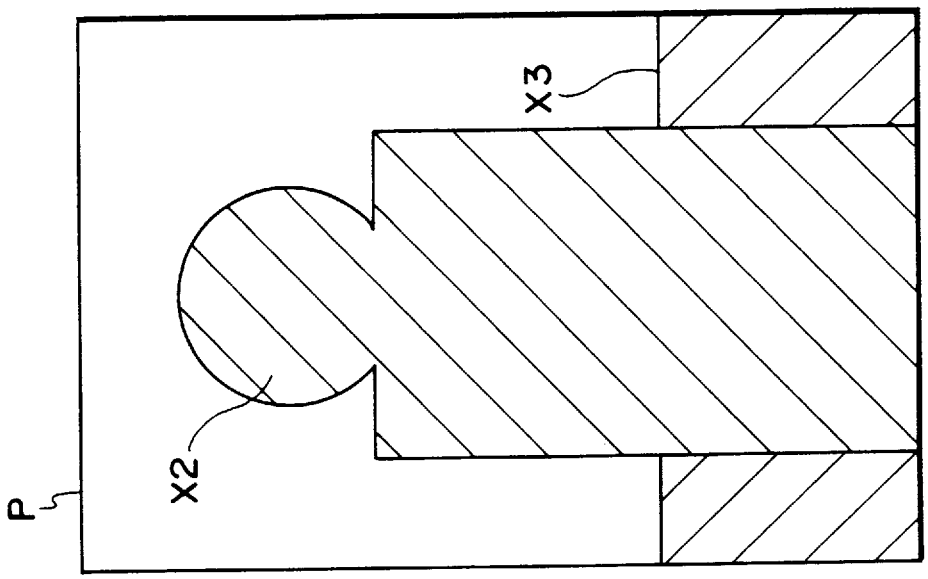
FIG. 31A shows an example in which the composition is estimated to be good in the fourth embodiment.
Figure 31B:
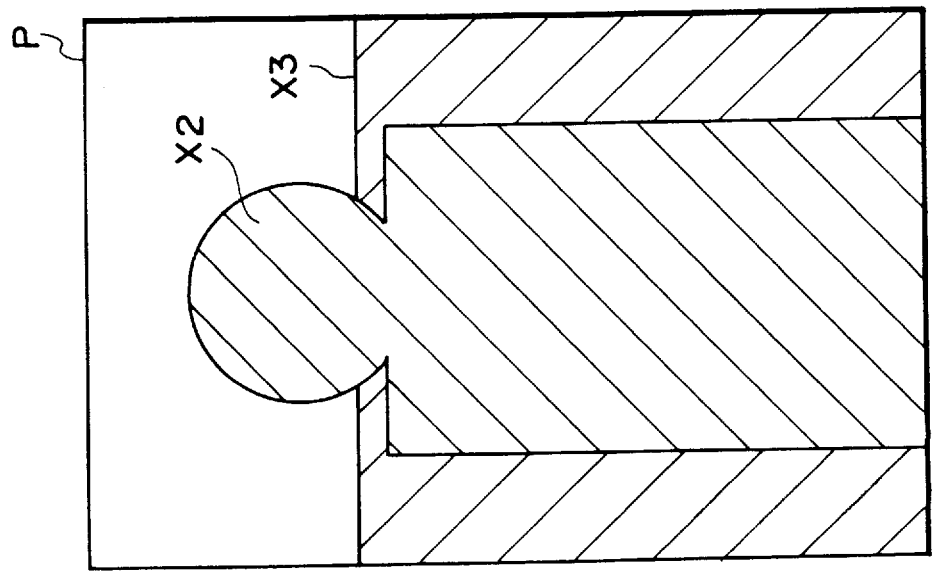
FIG. 31B shows an example in which the composition is estimated to be poor in the fourth embodiment.
Figure 32A:
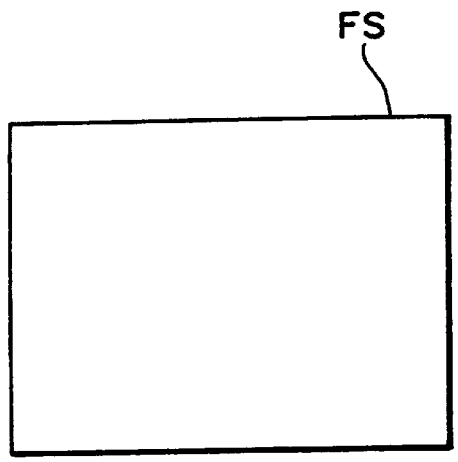
Figure 32B:
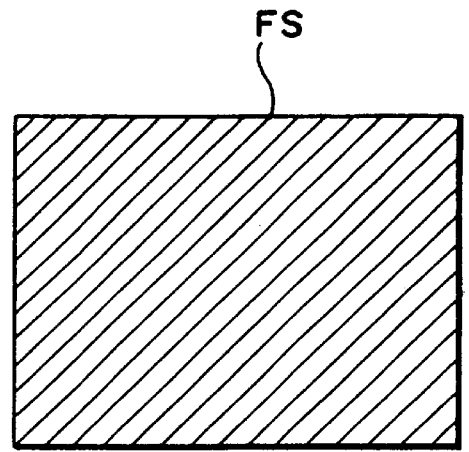
Figure 32C:
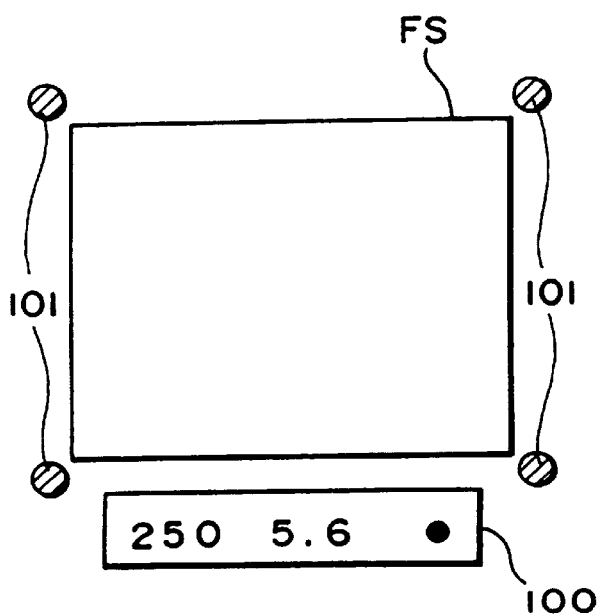
Figure 32D:
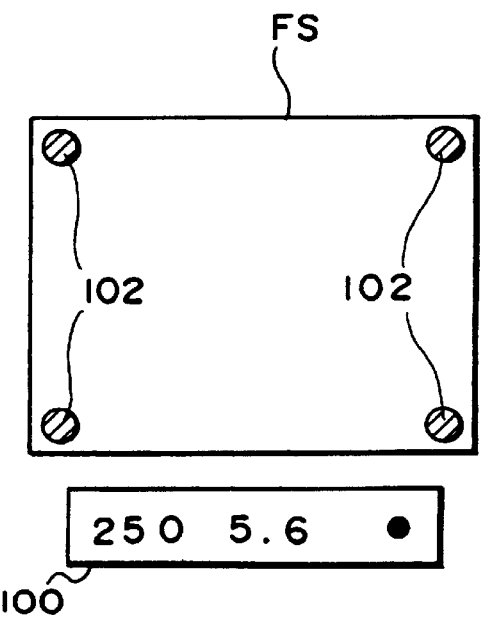
Figure 33B:
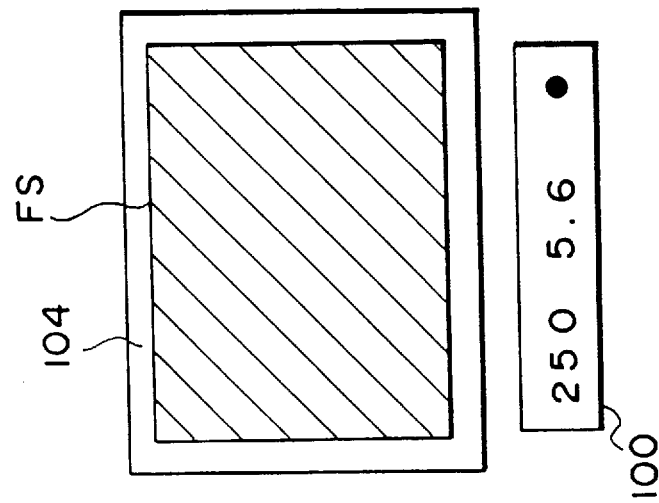
Figure 33A:
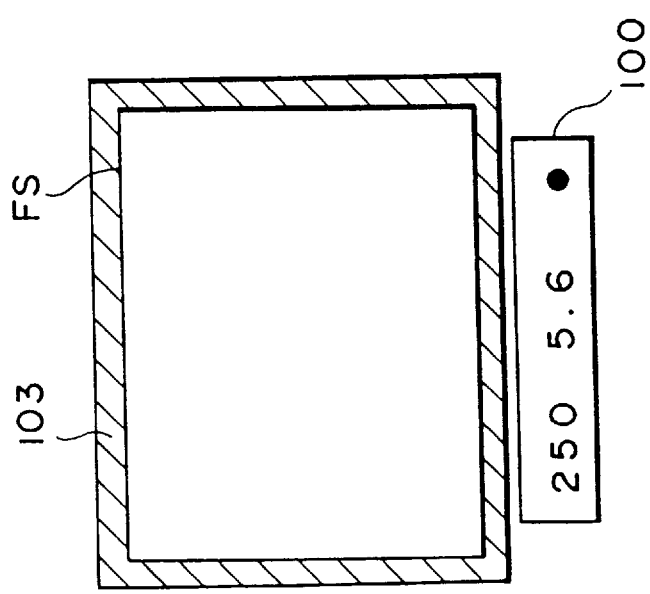
Figure 33D:
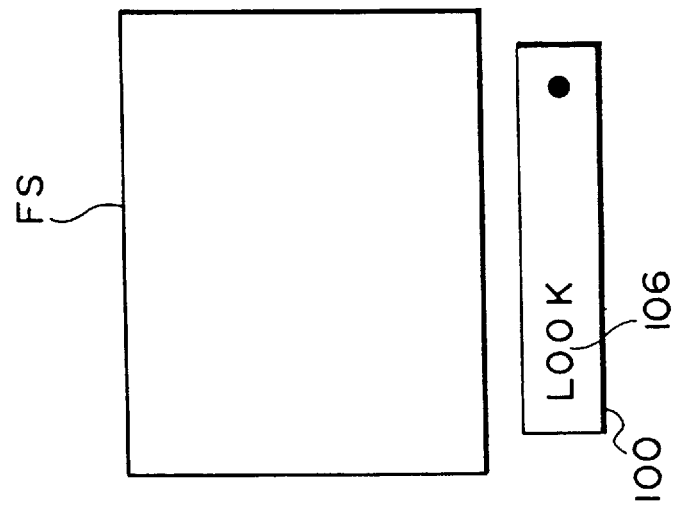
Figure 33C:
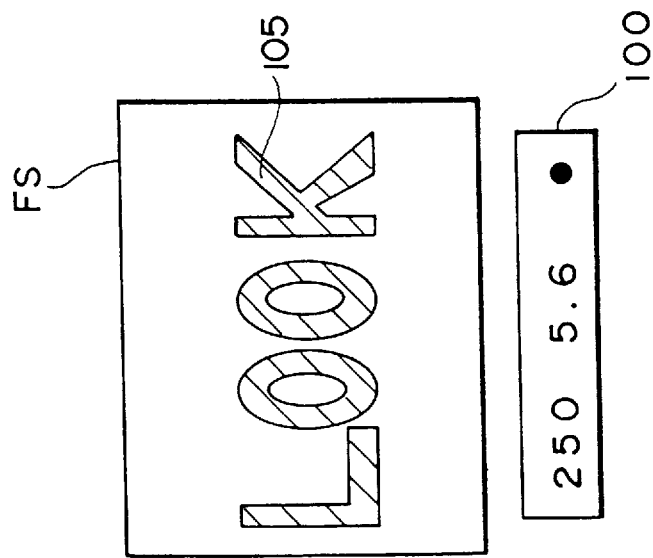

When the position of the main photographic subject has been determined, the positions of edges within the photographic field are detected in step S48. In this processing, the coordinates Xa, Xb, Xc and Xd of the columnar object X1 at the left and right ends (refer to FIG. 14) and the coordinates Ya, Yb, Yc and Yd of the horizontal edge X3 at the left and right ends (refer to FIGS. 19A and 19B) are determined as explained in the description of the second embodiment. When the positions of the edges have been determined, the operation proceeds to step S49, in which a decision is made as to whether or not the positional relationship between the main photographic subject and the edges falls into one of the typical examples of poor composition. For example, if the horizontal edge X3 is separated from the face of the main photographic subject X2 by a great distance, as shown in FIG. 31A, the composition is estimated to be good. In the reverse case, that is, if the horizontal edge X3 is crossing the vicinity of the face, as shown in FIG. 31B, the composition is judged to be poor. The composition is also judged to be poor if the columnar object X1 (FIG. 12) overlaps the main photographic subject X2.

If the composition is estimated to be poor in step S49, the operation proceeds to step S50, to issue a warning to the photographer that the composition is poor and then the operation returns to step S44. On the other hand, if the composition is estimated to be good, the operation proceeds to step S51, to display the indication that the composition is good. In this manner, in this embodiment, the position of the main photographic subject is specified based upon the distribution of the view points of the photographer. The estimation as to whether or not the composition is good is made based on the positional relationship between the main photographic subject and the edges. Consequently, even when the main photographic subject is off center in the photographic field, typical examples of poor composition can be accurately detected.

Depending upon the number of partition areas W, (the values of u, v) in the photographic field, as shown in FIG. 3A, there may be a plurality of areas W that correspond to the area of the face of the person. In order to deal with this situation, it is appropriate to calculate in advance the number of areas W that the face of the person covers and to set specific areas around the area where the view points are concentrated as the face of the person. As the size of the main photographic subject also changes in correspondence to the photographing magnification β, it is recommended that the photographing magnification β be calculated by adding the processing in steps S8~S10 shown in FIG. 4A and the areas that are regarded as the main photographic subject be adjusted according to the value of the photographing magnification β.

Although in this embodiment, the positions of the edges are determined by using the procedure for calculating the index numbers G1~G3 in the second embodiment described above, the present invention is not restricted to this method. For example, the horizon or the edges at boundaries between the photographic main subject and the background or between a columnar object and the background may be specified by detecting the edge with the greatest contrast within the photographic field as the first priority. Or, the position of the edge and its type may be identified through an edge detection method of the known art in the area of image processing, such as enhancing the edge by applying a differential filter on the distribution of photometric values detected by the photometric device 4.

FIGS. 32 and 33 show examples of warning displays that can be used in the various embodiments described above. FIG. 32A shows an example in which a warning is issued by changing the display color or the brightness of the indicator 100 that indicates shutter speed, exposure information and the like and which is provided on the lower side of the view finder field FS. FIG. 32B shows an example in which a warning is issued by changing the display color or brightness in the view finder field FS. FIG. 32C shows an example in which a warning is issued by either lighting or blinking the dot-like warning mark 101 on the outside of the corner of the view finder field FS. FIG. 32D shows an example in which a warning is issued by either lighting or blinking the dot-like warning mark 102 on the inside of the corner of the view finder field FS. FIG. 33A shows an example in which a warning is issued by either lighting or blinking the frame-like warning mark 103 on the outside of the view finder field FS. FIG. 33B shows an example in which a warning is issued by either lighting or blinking the frame-like warning mark 104 on the inside of the view finder field FS. FIG. 33C shows an example in which a warning is issued by either lighting or blinking the warning message 105 within the view finder field FS. FIG. 33D shows an example in which a warning is issued by either lighting or blinking the warning message 106 inside the indicator 100. These warnings can be used separately as appropriate for different purposes, such as for prompting verification of a composition based upon the dispersion index number E, for warning of poor composition based upon the poor composition index number G, for warning against hand-motion vibration and so forth.

In all the embodiments described above, the criteria for estimating whether or not a composition is poor can be changed according to the focal length of the photo-taking lens. For example, in the case of a wide angle lens, the likelihood of photographing a city or mountainous skyline in the background is high and also, a diagonal edge tends to be present in such compositions because of the perspective of the lens. For these reasons, therefore, the allowable range for the inclination of a columnar object or horizontal edge should be widened. If on the other hand, in the case of a telephoto lens, the background is often monotonous, and so the allowable range for the inclination of edges should be narrowed.

In all the embodiments explained so far, we assume that the camera is provided with a function for selecting various photographing modes, however, with a camera that has no such function, values for the judgement photographing magnification a and the area coefficient α which seem to be optimal and various requirements for poor composition should be determined in advance and be supplied to the CPU 1. The detection processing of the horizontal edge X3 explained in the second and third embodiment can be applied to an edge that divides the photographic field into two vertical portions, left and right, by switching the x axis direction and the y axis direction.

I claim:

1. A camera capable of issuing composition information, comprising:
   a view point information detection means for detecting information related to a distribution of view points of a photographer from a specific position within a photographic field, said view points being obtained by detecting a line of sight of the photographer, said view points being points at which the photographer is actually looking; and
   a composition quality estimation means for estimating whether a composition is good based upon the distribution of view points of the photographer, and estimating that a composition is poor when a degree of dispersion of view points of said photographic field does not exceed a specific allowable value.

2. A camera capable of issuing composition information according to claim 1, further comprising a warning means for issuing a warning when the composition is estimated to be poor.

3. A camera capable of issuing composition information according to claim 1 wherein:
   said specific position is a central portion of said photographic field.

4. A camera capable of issuing composition information according to claim 1 wherein:
   said specific position is a position at which view points are most densely concentrated within said photographic field.

5. A camera capable of issuing composition information according to claim 1 wherein:
   said specific position is a focal point detection area defined within said photographic field.

6. A camera capable of issuing composition information according to claim 1, further comprising:
   a magnification detection means for detecting a photographing magnification wherein:
   said composition quality estimation means changes said specific allowable value such that the degree of dispersion of view points is larger when said photographing magnification is reduced.

7. A camera capable of issuing composition information according to claim 1, further comprising:
   a magnification detection means for detecting a photographing magnification, and
   a warning prevention means for preventing the issue of said warning from said warning means when the photographing magnification exceeds a specific value.

8. A camera capable of issuing composition information according to claim 1, further comprising:
   a hand-motion vibration information detection means for detecting information related to a vibration state of the camera,
   a hand-motion vibration state judgment means for judging whether the vibration state is within an allowable range when estimating whether the composition is good, and
   a hand-motion vibration warning means for issuing a warning when the vibration state has been judged to be outside said allowable range when estimating whether a composition is good.

9. A camera capable of issuing composition information, comprising:
   a view point information detection means for detecting information related to a distribution of view points of a photographer within a photographic field, said view points being obtained by detecting a line of sight of the photographer,
   a composition quality estimation means for judging whether a degree of dispersion of view points of the photographer from a specific position within said photographic field does not exceed a specific allowable degree of dispersion based upon detected information from said view point information detection means, and estimating that a composition is poor when the degree does not exceed said specific allowable degree of dispersion, and
   a warning means for issuing a warning when the composition is estimated to be poor.

10. A camera capable of issuing composition information according to claim 9 wherein:

said specific position is a central portion of said photographic field.

11. A camera capable of issuing composition information according to claim 9 wherein:

said specific position is a position at which view points are most densely concentrated within said photographic field.

12. A camera capable of issuing composition information according to claim wherein:

said specific position is a focal point detection area defined within said photographic field.

13. A camera capable of issuing composition information according to claim 9, further comprising:

a magnification detection means for detecting a photographing magnification wherein:

said composition quality estimation means changes said specific allowable value such that the degree of dispersion of view points is larger when said photographing magnification is reduced.

14. A camera capable of issuing composition information according to claim 9, further comprising:

a magnification detection means for detecting a photographing magnification, and a warning prevention means for preventing the issue of said warning from said warning means when the photographing magnification exceeds a specific value.

15. A camera capable of issuing composition information according to claim 9, further comprising:

a hand-motion vibration information detection means for detecting information related to a vibration state of the camera;

a hand-motion vibration state judgment means for judging whether the vibration state is within an allowable range when estimating whether composition is good, and a hand-motion vibration warning means for issuing a warning when the vibration state has been judged to be outside said allowable range when estimating whether a composition is good.

16. A camera capable of issuing composition information, comprising:

a view point information detection circuit that detects information related to a distribution of view points of a photographer within a photographic field, said view points being obtained by detecting a line of sight of the photographer, and issues signals as a result of the detection, said view points being points at which the photographer is actually looking, a composition quality estimation circuit that estimates whether a composition is good based upon the issued signals from said view point information detection circuit, estimates that a composition is poor when a degree of dispersion of view points of said photographic field does not exceed a specific allowable value, and issues signals as a result of the estimation.

17. A camera capable of issuing composition information according to claim 16, further comprising a warning device that issues a warning when a signal indicating poor composition has been issued from said composition quality estimation circuit.

18. A method for issuing composition information for a camera, comprising the steps of:

detecting information relating to a distribution of view points of a photographer within a photographic field, said view points being obtained by detecting a line of sight of the photographer, said view points being points at which the photographer is actually looking;

estimating whether a composition is good based upon the distribution of view points of the photographer; and estimating that a composition is poor when a degree of dispersion of view points of said photographic field does not exceed a specific allowable value.

19. A method for issuing composition information for a camera according to claim 18, further comprising a step of issuing a warning when the composition is estimated to be poor.

20. A camera capable of issuing composition information, comprising:

a view point information detection circuit that detects information related to a distribution of view points of a photographer within a photographic field, said view points being obtained by detecting a line of sight of the photographer, and issues signals as a result of the detection, said view points being points at which the photographer is actually looking, a composition quality estimation circuit that estimates whether a degree of dispersion of view points of the photographer field does not exceed a specific allowable degree of dispersion based upon an issued signal from said view point information detection circuit, and estimates that a composition is poor when the degree of dispersion does not exceed said specific allowable degree of dispersion and issues signals as a result of the estimation, and a warning device that issues a warning when a signal indicating poor composition has been issued from said composition quality estimation circuit.

21. A method for issuing composition information for a camera, comprising the steps of:

detecting information related to a distribution of view points of a photographer within a photographic field, said view points being obtained by detecting a line of sight of the photographer, said view points being points at which the photographer is actually looking, making a decision as to whether a degree of dispersion of view points of the photographer from a specific position within said photographic field does not exceed a specific allowable degree of dispersion, estimating a composition to be poor when said degree of dispersion does not exceed said specific allowable degree of dispersion, and issuing a warning when the composition is estimated to be poor.

* * * * *